US008616947B1

(12) United States Patent
Fontaine et al.

(10) Patent No.: US 8,616,947 B1
(45) Date of Patent: Dec. 31, 2013

(54) METHOD AND SYSTEM FOR CONDUCTING CONCURRENT MULTI-VENUE MULTI-RACE MULTI-OUTCOME PROGRESSIVE PARI-MUTUEL WAGERING

(76) Inventors: Anthony deLisle Fontaine, Henderson, NV (US); Michael Jay Staw, Westport, CT (US)

( * ) Notice: Subject to any disclaimer, the term of this patent is extended or adjusted under 35 U.S.C. 154(b) by 155 days.

(21) Appl. No.: 12/763,556

(22) Filed: Apr. 20, 2010

(51) Int. Cl.
*A63F 13/00* (2006.01)

(52) U.S. Cl.
USPC .................... 463/6; 273/139; 463/16; 463/25

(58) Field of Classification Search
USPC ............................. 463/6, 25, 28, 16; 273/139
See application file for complete search history.

(56) References Cited

U.S. PATENT DOCUMENTS

| | | | | |
|---|---|---|---|---|
| 7,713,125 B2 * | 5/2010 | Asher et al. | ..................... | 463/28 |
| 8,007,354 B2 * | 8/2011 | Mindes | ........................... | 463/16 |
| 8,070,595 B2 * | 12/2011 | Alderucci et al. | .............. | 463/25 |
| 8,092,301 B2 * | 1/2012 | Alderucci et al. | .............. | 463/25 |
| 2005/0116410 A1 | 6/2005 | Vlazny et al. | | |
| 2007/0197281 A1 | 8/2007 | Stronach | | |
| 2008/0248846 A1 | 10/2008 | Stronach et al. | | |

OTHER PUBLICATIONS

AplusThorobred.com, URL http://www.aplusthorobred.com, 3 pages, printed Jan. 3, 2011.
Handicapper's Data Warehouse, URL http://horsedata.com, 1 page, printed Oct. 14, 2010.
Klein, Steve, "The Power of Early Speed," URL http://www.powerofearlyspeed.com, 3 pages, printed Oct. 14, 2010.
The Magna 5,EQUIBASE Company, 12 pages, 2004.

* cited by examiner

*Primary Examiner* — Masud Ahmed
(74) *Attorney, Agent, or Firm* — Lewis Roca Rothgerber LLP

(57) ABSTRACT

A method and system for conducting concurrent multi-venue multi-race, multi-outcome, progressive pari-mutuel wagering allows players to pick the favorite in a prespecified number of races to win, place, and/or show. Players can pick manually, pick specific rows or columns, or utilize quick picks. Pools are seeded, wagers are pooled, and pool winners split pools. When pools aren't won, the amount in the pools transfer to the next pool. An operator interface allows specification of pool and pick types, pool size, ticket price, and pool distribution, including allocation of pool seed, progressive, and operator take.

24 Claims, 25 Drawing Sheets

FIG. 3D

| | | |
|---|---|---|
| 361 | Pool Number: | 2498 |
| | Date: | 2/2/2010 |
| 362 | Price Per Ticket | $10.00 |
| 363 | Fee Base/Selection | $2.00 |
| 364 | Total Tickets Sold | 593 |
| 365 | Total Selections | 2965 |

| | Host Fee (366) | Total Selections (367) | Fee Base (368) | Total Fees (369) |
|---|---|---|---|---|
| Arapahoe Park | 4% | 167 | $2.00 | $ 13.36 |
| Assinboia Downs | 4% | 185 | $2.00 | $ 14.80 |
| Beulah Park | 3% | 235 | $2.00 | $ 14.10 |
| Canterbury Park | 4% | 189 | $2.00 | $ 15.12 |
| Charles Town | 4% | 158 | $2.00 | $ 12.64 |
| Delaware Park | 3% | 156 | $2.00 | $ 9.36 |
| Finger Lakes | 3% | 177 | $2.00 | $ 10.62 |
| Harrington | 3% | 189 | $2.00 | $ 11.34 |
| Louisiana Downs | 5% | 230 | $2.00 | $ 23.00 |
| Meadowlands | 5% | 230 | $2.00 | $ 23.00 |
| Monmouth | 6% | 208 | $2.00 | $ 24.96 |
| Penn National | 5% | 235 | $2.00 | $ 23.50 |
| Philadelphia Park | 4% | 249 | $2.00 | $ 19.92 |
| Prairie Meadows | 4% | 187 | $2.00 | $ 14.96 |
| Raceway Park | 3% | 170 | $2.00 | $ 10.20 |
| | | 2965 | | $ 240.88 |

FIG. 3E

| | | |
|---|---|---|
| 361 | Pool Number: | 2504 |
| | Date: | 2/2/2010 |
| 362 | Price Per Ticket | $2.00 |
| 363 | Fee Base/Selection | $0.40 |
| 364 | Total Tickets Sold | 593 |
| 365 | Total Selections | 2965 |

| | Host Fee (366) | Total Selections (367) | Fee Base (368) | Total Fees (369) |
|---|---|---|---|---|
| Arapahoe Park | 4% | 167 | $0.40 | $ 2.67 |
| Assinboia Downs | 4% | 185 | $0.40 | $ 2.96 |
| Beulah Park | 3% | 235 | $0.40 | $ 2.82 |
| Canterbury Park | 4% | 189 | $0.40 | $ 3.02 |
| Charles Town | 4% | 158 | $0.40 | $ 2.53 |
| Delaware Park | 3% | 156 | $0.40 | $ 1.87 |
| Finger Lakes | 3% | 177 | $0.40 | $ 2.12 |
| Harrington | 3% | 189 | $0.40 | $ 2.27 |
| Louisiana Downs | 5% | 230 | $0.40 | $ 4.60 |
| Meadowlands | 5% | 230 | $0.40 | $ 4.60 |
| Monmouth | 6% | 208 | $0.40 | $ 4.99 |
| Penn National | 5% | 235 | $0.40 | $ 4.70 |
| Philadelphia Park | 4% | 249 | $0.40 | $ 3.98 |
| Prairie Meadows | 4% | 187 | $0.40 | $ 2.99 |
| Raceway Park | 3% | 170 | $0.40 | $ 2.04 |
| | | 2965 | | $ 48.18 |

- Fixed Odds Payouts – Pick 4
- Payout Odds Assumptions
  - 30.8% winners,
  - 51.2% place and
  - 65.5% show
- .308 x .308 x .308 x .308 = .00899 or 110 to 1 for win.
- .512 x .512 x .512 x .512 = .0687or 14 to 1 for place.
- .655 x .655 x .655 x .655 = .1840 or 4 to 1 for show.
- .655 x .655 x .655 x .512 = .1438 or 6 to 1 for a winning combination P/S (1 place, 3 shows; ).
- .308 x.655 = .20714 or 3.8 to 1 for a winning combination of (1) Win; includes a Win/Place and Show and (1) Show

FIG. 9A

- Fixed Odds Payouts – Pick 5
- Payout Odds Assumptions
  - 30.8% winners,
  - 51.2% place and
  - 65.5% show
- .308 x .308 x .308 x .308 x .308 = .00277 or 360 to 1 for win.
- .512 x .512 x .512 x .512 x .512 = .03518 or 27 to 1 for place.
- .655 x .655 x .655 x .655 x .655 = .12056 or 7 to 1 for show.
- .655 x .655 x .655 x .655 x .512 = .09423 or 9.6 to 1 for a winning combination P/S (4 shows; 1 place)
- .308 X .512 = .15769 or 5.3 to 1 for a winning combination of (1) Win; includes a Win, Place and Show and (1) Place; includes a Place and Show

FIG. 9B

- Fixed Odds Payouts – Pick 6
- Payout Odds Assumptions
  - 30.8% winners,
  - 51.2% place and
  - 65.5% show
- .308 x .308 x .308 x .308 x .308 x .308 = .000853 or 1,171 to 1 for win.
- .512 x .512 x .512 x .512 x .512 x .512 = .018014 or 55 to 1 for place.
- .655 x .655 x .655 x .655 x .655 x .655 = .07896 or 12 to 1 for show.
- .655 x .655 x .655 x .655 x .655 x .512 = .06172 or 15 to 1 for best combination wps (5 shows; 1 place).
- 380 X .308 = .09486 or 9.5 to 1 for a winning combination of (1) Win; includes a Win, Place and Show and (1) Place; includes a Place and Show

FIG. 9C

METHOD AND SYSTEM FOR CONDUCTING CONCURRENT MULTI-VENUE MULTI-RACE MULTI-OUTCOME PROGRESSIVE PARI-MUTUEL WAGERING

BACKGROUND OF THE INVENTION

1. Field of the Invention

The present invention relates to wagering and, more specifically, to a method for conducting concurrent multi-venue, multi-race, multi-outcome progressive pari-mutuel wagering.

2. The Prior Art

Pari-mutuel wagering essentially includes the placing of wagers by a plurality of individuals on the outcome of an event, wherein the bettors who place "winning" wagers share the betting pool minus a percentage taken out for the management or administration of the wagering activity. For example, pari-mutuel wagering is often associated with racing (e.g., horses or dogs) wherein individuals may place wagers on one or more aspects of the outcome of the race. These aspects may include, for example, which of the participants (also referred to herein as runners) will win the race, the order in which a plurality of runners will finish the race (e.g., exacta—ordered prediction of first and second place; trifecta—ordered prediction of first, second and third place; superfecta—ordered prediction of first through fourth place; etc.), or a runner finishing within a specified range of positions (e.g., a "show" wager for a given runner to finish in either first, second or third place; or a quinella wager for predicting the first and second place finishers regardless of order).

For those individuals who have placed a winning wager such that their prediction matches an actual event outcome, their payout is determined, in part, by the difficulty of the wager (e.g., a show wager vs. a trifecta wager), in part, by the size of the pool as defined by the total amount of wagers placed for a given event and, in part, the specific wagers made by other bettors. Thus, for example, if a defined prize pool is to be paid out to those wagers which selected runner X as the winner and, for example, 20 individual wagers were placed on runner X to win, the prize pool will be divided among those 20 bettors in proportion to the amount each of the 20 individual bettors wagered on such an outcome.

Pari-mutuel wagering is preferred by some individuals because a wager may be "handicapped" in the sense that a bettor may study different facets of an event to make an educated prediction of the outcome of the event prior to placing their wager. For example, in a horse race, a bettor may review the past performances of the horses, the training histories of the horses, the breeding histories of the horses, which jockeys will be participating and other related information. Consideration of such information enables a bettor to make a more educated prediction regarding the outcome of a race or other event.

Many individuals prefer other types of wagering activities, such as slot machines, purchasing of lottery tickets, or other conventional wagering activities offered at a casino or a lottery facility, because they find the act of handicapping a pari-mutuel wager to be complex, difficult and time consuming. Furthermore, several hours may pass between the time an individual places a wager on a series of races and the outcome of the wager is made known. Such is in contrast to casino wagering wherein multiple wagers may be placed and the outcome of each be made known in rapid succession such as with slot machines.

There have been various attempts by pari-mutuel venues to attract the individuals who are attracted either to simpler wagering activities or the potential for a larger payout. For example, random wagers, sometimes referred to as "quick picks", have been offered at pari-mutuel venues to satisfy those patrons which prefer simpler wagering activities. Such a random wager may include an appropriately configured wagering terminal which is configured to randomly choose the outcome of the event (e.g., the winning runner of a race) on which the bettor places his or her wager. These wagers are added to the pool of wagers or, in other words, commingled with handicapped wagers which have been placed in regards to the same event. However, those individuals that are placing random wagers, such as a quick-pick type wager, may feel disadvantaged by the fact that other bettors are handicapping their wagers and, therefore, that such other bettors may have a better chance at winning a portion of the wagering pool.

An important factor in attracting patron interest is the size and frequency of the probable jackpot that a patron can expect to win. Thus, it is desirable to provide relatively large jackpots available in a faster timeframe than is currently offered in the sport. Prior to the invention, multi-event wagers were limited to single venue settings. Due to this limitation, a player was required to wait until the sequence of races was completed, a process which could take several hours.

While expertise in wagering on horse racing is beneficial, a novice is not disadvantaged because each horse is favored to win their race. Statistically a horse will finish "in the money" (either first, second or third) approximately 70% of the time. This provides a more level foundation from which novices predictions are based on the exact same horses that the experienced handicapper must select from.

Therefore it would be advantageous to provide a lottery-type game or a method of pari-mutuel wagering which is attractive to a wide variety of patrons and provides for increased number of jackpots available at a greater frequency with larger payouts. It would also be advantageous to provide a method of playing a lottery-type game or placing a pari-mutuel wager with a simplified wagering process such that reduces some of the complexity commonly associated with the pari-mutuel form of wagering. Finally, it would also be advantageous to offer multiple prize tiers so that less experienced bettors, including lottery players, have an improved opportunity to win despite not being an experienced handicapper.

BRIEF SUMMARY OF THE INVENTION

A system and a method for conducting concurrent, multi-venue, multi-event, multi-outcome, progressive, pari-mutuel wager is provided. In an exemplary embodiment, a series of at least nine race sequential events is identified and represented in a 25 grid square with each square representing a particular wagering event in which the runner (e.g. horse) favored to win the event is displayed to the player. Each bettor is enabled to make a specified prediction pertaining to the outcome of five of the identified race events. The operator of the system defines the event outcomes required to win a specified progressive pool. In the example, the operator establishes a multi-outcome pool whereby a mixture of Win, Place, and Show outcomes may be combined to win the pool. However any type of pool may be defined. Each wager entry includes predictions for a specified number of the identified race events, in this example, five. Winnings may be allocated from a wager pool based on the wager entries having completely correct entries or entries that are correct for most of the race events. If the pool is not won, the amount remaining may be allocated to the pool now available for the next offering of events. The new pool may be determined by the addition of the next available racing event following the last race of the previous pool. Once the pool has been won, the system calculates fees due to participating racetracks based upon the total number of selections made during play and the fees as agreed to between the operator and the racetrack venue. One timing advantage of offering concurrent, multi-venue, multi-event based wagers provides a player with new wagering opportunities in rapid succession. Offering a multi-outcome wager based on an event favorite provides a novice with a much better probability of success, while providing an experienced handicapper a focused opportunity to analyze an increased number of wagering options. The progressive nature of the pool provides larger jackpots attractive to both experienced players and novices alike. One important principal of utilizing sequential, pari-mutuel events to define a fixed opportunity for entry and whose outcome is based on the comparison of a pre-determined selection and an actual result, provides the foundation for embodiments utilizing fixed-odds based payouts where the pari-mutuel pool payout is replaced by a defined payout. Utilizing the invention, a multi-event wager can now take place every few minutes and multiple concurrent pools may be entered using many of the same event selections. This provides a player with the opportunity to utilize selections from a previous pool in a subsequent pool thereby reducing the number of handicapping requirements for entry into each pool. This invention also has application in the realm of contests and fantasy games whereby points replacing real money are used as a scoring mechanism for the opportunity to win a prize, and lottery applications whereby an element of chance is inherent in the placement of the entry.

BRIEF DESCRIPTION OF THE DRAWINGS

FIG. 3D is an example of Host Fee calculations performed by the system based on the fee schedule previously defined.

FIG. 3E is a diagram depicting the same process using a $2 ticket as an example.

FIGS. 9A, 9B, and 9C show exemplary calculations of payout odds for Pick 4 (FIG. 9A), Pick 5 (FIG. 9B), and Pick 6 (FIG. 9C), in accordance with one embodiment of the present invention;

DETAILED DESCRIPTION

In one aspect, the invention provides a method for conducting a wager. The method includes the steps of identifying a fixed number of sequential race events; defining the wager by specifying a predictive outcome for each race event based upon the favorite horse to win their event; to ensure a minimum pool amount is available for the wager; receiving at least one wager entry; comparing each actual outcome to each predictive outcome for each received wager entry after an actual outcome for each race event has been determined; for each received winning wager entry, determining a amount of winnings to be awarded based the number of winning entries; and a method for determining the fees due to each venue participating in the multi-event wager.

The operator hosting the pool determines the number of events, and the wager types to be offered, whose winning outcomes represent the type of pool to be won. A defined pool requires the player to successfully predict the outcome of the number events defined by the operator. The pool represents the prize money available to players successfully predicting the correct wagers as specified by the operator. The wager may be comprised of all winning outcomes (Win), all second place (Place) outcomes, all third place or Show outcomes, or any combination of Win, Place or Show outcomes. The operator also defines the number of event choices that are made available to the player for selection.

Figure 6A:
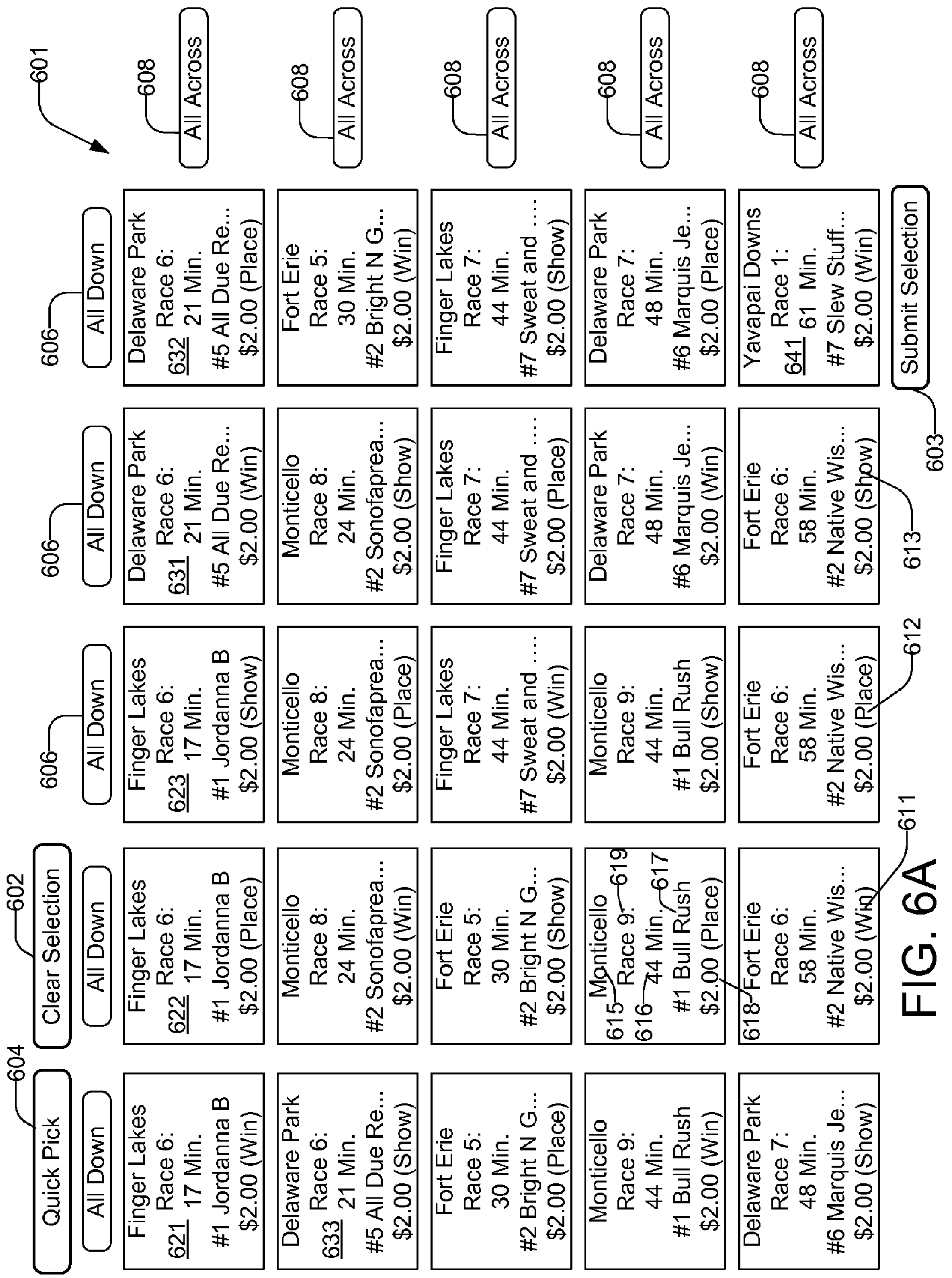
FIGS. 6A through 6F are diagrams showing an example of a Pick 5, Play Any Event, Multi-Venue Wager display, in accordance with one embodiment of the present invention.
Figure 6B:
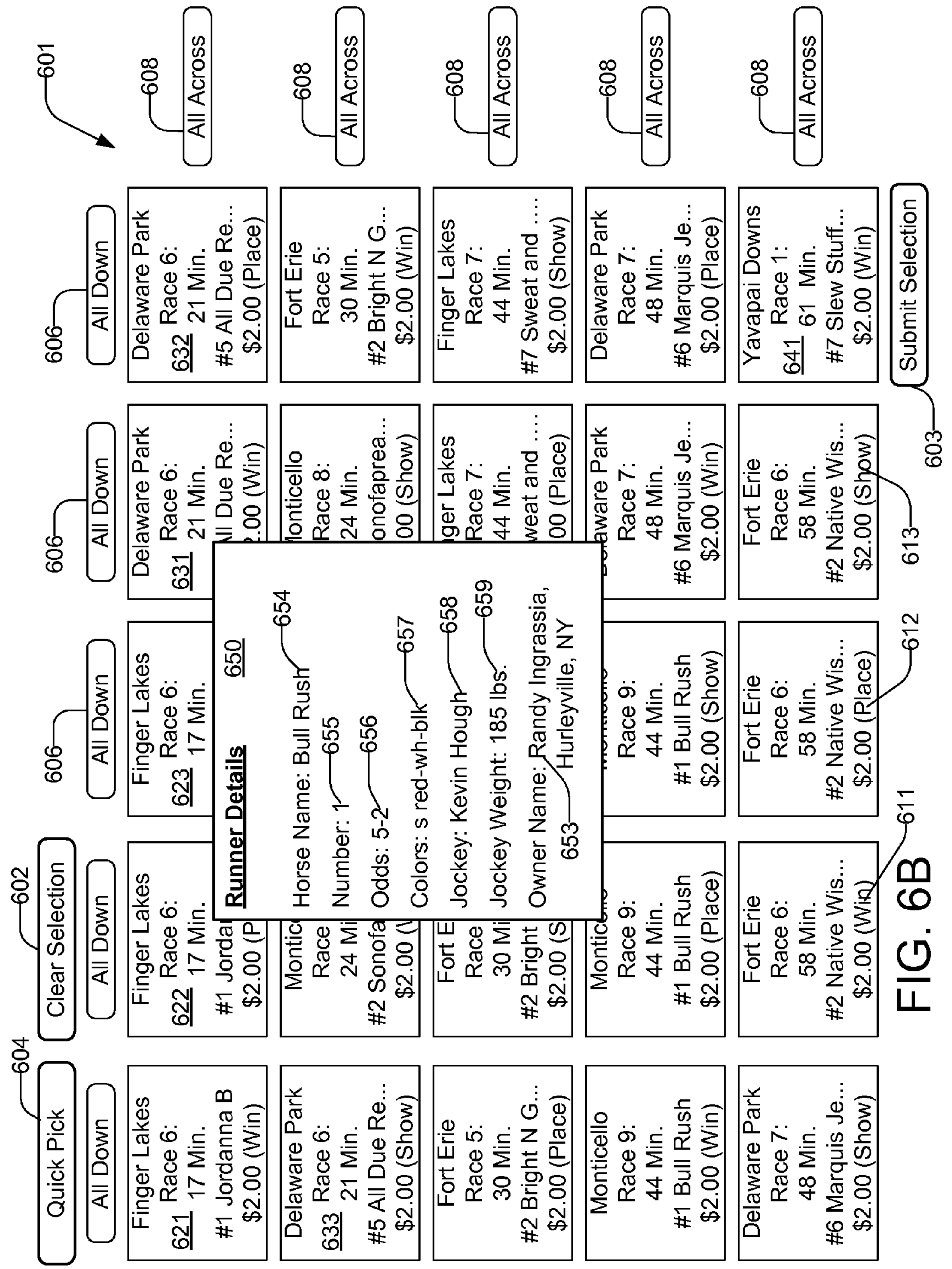

In the attached exemplary embodiment (Multi-Venue Examples) the operator offers a grid of 25 possible event selections (FIG. 6A). These 25 displayed events reflect a predicted outcome whereby the selection in the event is the horse favored to win the event. The favorite is determined by the odds, either the morning line (odds set typically before the commencement of wagering), the odds when a pool opens, or the current odds. Each event is the next race available to the operator for use in the wager. For this example the operator has defined a "Pick Any Five" pool in which the player may select from any of the possible 25 outcomes. A player chooses five selections that comprise the wager. Upon selection the event is highlighted. To assist the player, additional information such as the odds, jockey name and weight, owner, etc. may be provided (FIG. 6B). For this wager the display offers the player several "quick pick" functions including "All Across" (FIG. 6C), "All Down" (FIG. 6D), and "Quick Pick" (FIG. 6E) that randomly makes 5 selections on the player's behalf. A player is not restricted by wager type for the defined pool in this instance. However, if it were a Show pool, the player would be limited to choosing only those wagering events representing a Show wager.

The operator may seed the pool with a starting point for the progressive and may guarantee a minimum prize for a successful wager regardless of the actual contribution by successive pari-mutuel wagers into the pool. Once the pool has been seeded, a portion of each wager is set aside to seed the next pool. The operator may be responsible to seed the pool if there has not been a sufficient amount of contributions to meet the minimum pool prize requirements or the outcome of the preceding pool has not been determined. Therefore, a percentage of each wager is contributed to the prize pool, retained for the purpose of paying fees to participating venues, retained to seed subsequent pools, and retained by the operator as profit.

The step of determining winnings includes determining a correct match between the predictive outcome and the actual outcome for all of the required number of (horse) race events, then determining the number of players having the required number of correct matches, and dividing the prize pool equally amongst the player. In another embodiment, winnings are determined not only by the correct number of predictive matches, but also by the winning amount generated by each individual correct predictive match. In this embodiment several different payout schemes may be implemented including: "winner take all" in which the person with the greatest sum total receives the entire prize pool, or, tiered payouts in which a set percentage of the prize pool amount is awarded corresponding to various predetermined levels, i.e. first, second or third place. Other payout schemes are also within the scope of the present invention.

In another aspect, the invention provides a system for conducting a wager. The system may include a server computer and at least one client computer. The client computer is typically in communication with the server computer via a network. The server computer may be configured to communicate a set of parameters defining the wager to the at least one client computer. The parameters may include an identification of the number of race events and a specified predictive outcome for each race event. The server computer may be further configured to receive from at least one client computer at least one wager entry which includes a prediction corresponding to the specified predictive outcome for each race event. After an actual outcome for each race event has been determined, the server computer may be further configured to compare the actual outcome to the specified predictive outcome for each race event for each received wager entry and, based on a result of the comparing, to determine a level of winnings to be awarded for each received wager entry. Other methodologies are also within the scope of the present invention.

The server computer may be further configured to determine a highest level of winnings corresponding to a correct match between the predictive outcome and the actual outcome for all of the required number of race events, and to determine the various levels of winnings corresponding to a correct match between the predictive outcome and the actual outcome.

The server computer may be further configured to determine the amount of fees that will be paid to participating venues, commonly known as host fees. Unlike all other multi-event wagers which transpire at a single venue, the multi-venue nature of the invention requires a more sophisticated method for the determination of host fees. The server computer will typically identify the number of events held at each participating venue for which an entry into the pool was placed and the total number of events held prior to the successful completion of the wager. Each venue will be identified as having a hosted a percentage of events contributing to the total number of events completed during the wagering process. The amount of the pool retained for the purpose of paying host fees is then divided according to the percentage of events held at each venue.

In yet another aspect, the invention provides a wagering game. The game includes a plurality of wager entries and a wagering pool. Each of the plurality of wager entries includes a predictive outcome for each of more than one time sequential, multi-venue predetermined race events. When an actual outcome for each race event has been determined, a percentage amount of the wagering pool is allocated to each of the plurality of wager entries based on a comparison of each predictive outcome to each actual outcome. The game proceeds using the same form and method as for wagering, however it may be played for points rather than actual money.

In a derivative embodiment of the preceding aspect of the present invention, the prize is a fixed payout and is played without the concurrent, sequential, progressive aspect of the invention.

In another embodiment of the present invention, a predetermined number of sequential pari-mutuel events is used to define a fixed odds wager or game. In this embodiment there are no pools and an operator is typically solely responsible for payouts. The operator can make a mathematical determination of the predicted odds for each wager type based upon the events comprising the wager. Exemplary predicted odds for a several Pick 4 wagers are shown in FIG. 9A. Exemplary predicted odds for a Pick 5 wager are shown in FIG. 9B and those for a Pick 6 wager shown in FIG. 9C.

Figure 1:
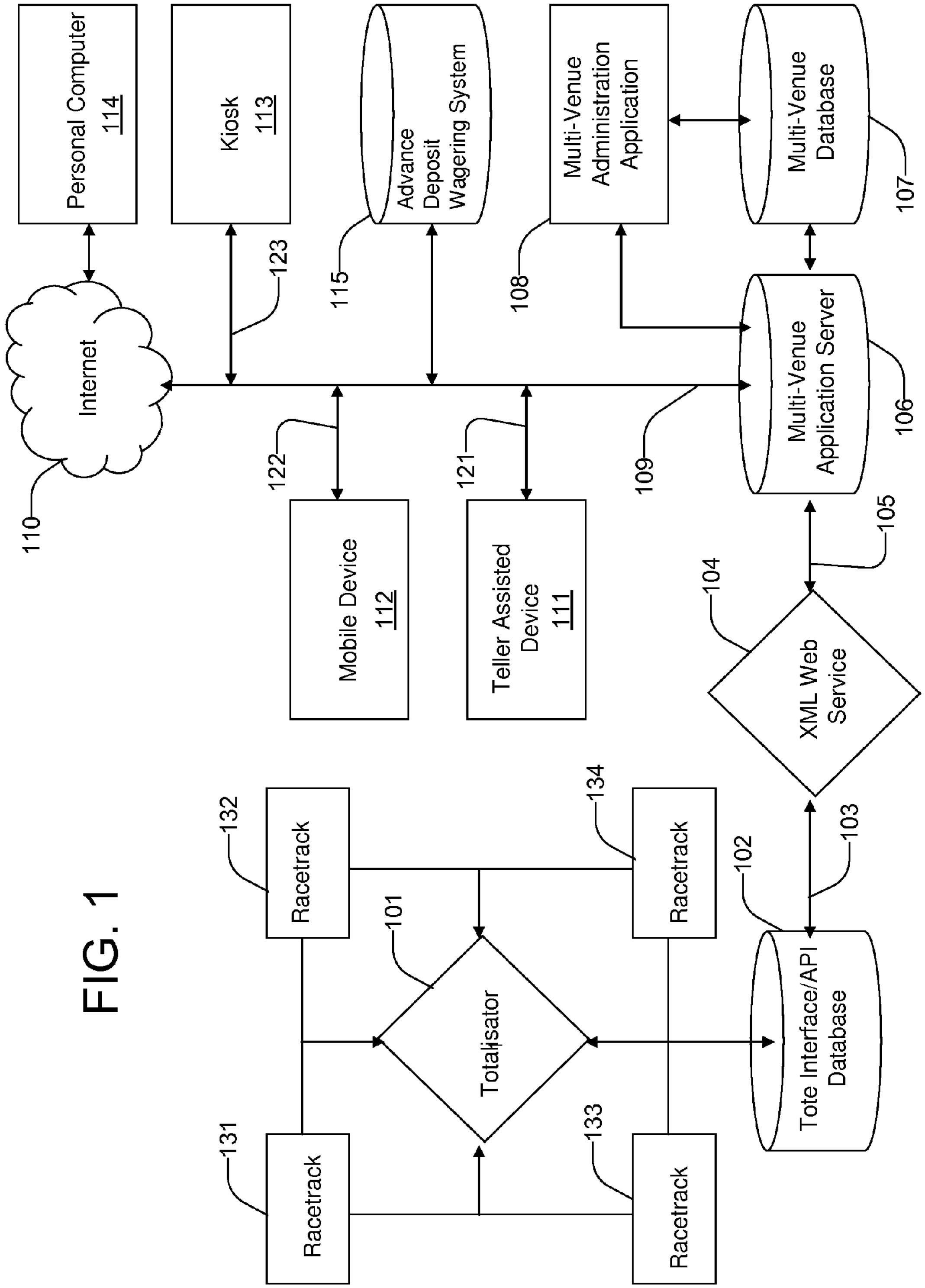
FIG. 1 is a block diagram of a system for conducting a Multi-Venue Wager according to one embodiment of the present invention.

FIG. 1 is a block diagram of a system for conducting a Multi-Venue Wager according to one embodiment of the present invention. According to a preferred embodiment of the invention, a multiplicity of racetracks, or venues (131, 132, 133, 134) that are connected to a Totalisator (101), (also known as a tote) for the purpose of sharing event information including calculating odds, pooling wagers and determining payouts based upon event outcomes, are connected to a tote interface through an API and database (102). A bi-directional interface (103) utilizes an XML Web Service (104) to communicate through a bi-directional interface (105) with a Multi-Venue Application Server (106). The Application Server (106) contains the Multi-Venue Application described further in subsequent drawings. The Server's (106) functions are managed by an Administrative Application (108) and all activity is recorded in a Database (107). The Server communicates via a plurality of bi-directional interfaces (109) including the Internet (110) offering the secure communication of wagering information and wagering data. A variety of wagering devices may be connected to communications interfaces. Teller Assisted Devices (111) may be offered where human interaction with the customer is desirable. In this embodiment of the invention, a teller may accept voice instructions from a customer and manually enter the wager based upon the instructions provided. Common examples of this form of wagering include over-the-counter transactions such as found at race tracks and Off Track Betting parlors, also known as OTBs. Mobile Devices may also be used to access the wagering application through a variety interfaces compatible with SMS messaging, and web application compatible devices such as iPhones, Palms and Blackberrys (112). Kiosk's (113) may be utilized to provide self service access in any physical location over a secure network either and Personal Computers (114) allowing users access from remote locations. For account based wagers, commonly referred to as Advance Deposit Wagers (ADW), the system is connected to an Advance Deposit Wagering System (115) which tracks customer deposits, withdrawals, wagers, settlements, etc.

Figure 2:
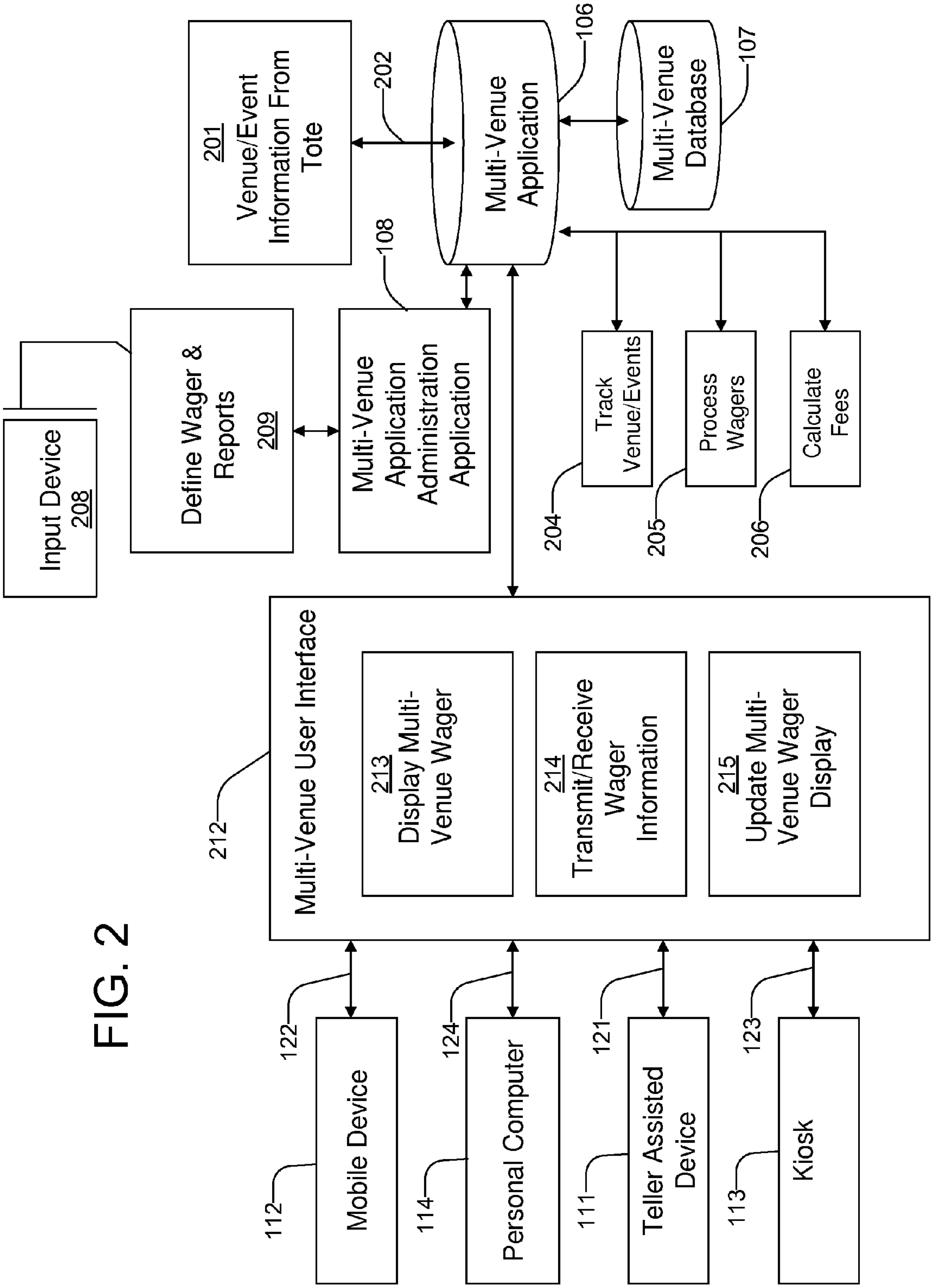
FIG. 2 is a block diagram of the system for the setup, display and processing of a multi-event wager, in accordance with the system shown in FIG. 1.

FIG. 2 is a block diagram of the system for the setup, display and processing of a multi-event wager, in accordance with the system shown in FIG. 1. It depicts the functions of the Multi-Venue Wagering application whereby venue event information (201) is received from the various venues through the tote interface (202) by the Multi-Venue Application; MVA (106). The MVA (106) is responsible for tacking and updating all venues and events (204), processing wagers (205), including receiving, tracking, and comparing the predicted outcome of the event to the actual outcome of the event. Once there has been a successful wager, the MVA processes the winning and calculates fees (206). All information relating to the operation of the MVA is stored in a database (107). An MVA (106) is defined by a user via an input device (208) such as a keyboard and monitor connected to the MVA (106). An adjunct application (209) provides a user interface to define the various forms of the wager as well as the specification for any reporting requirements. The wagering application may be displayed on the Multi-Venue User Interface MVUI (212) through which: wagers are displayed (213); wagers are transmitted and confirmations received (214); and constantly updated as required (215). The MVUI (212) may be presented though various secure communications (122, 124, 121, 123) to various target interactive devices, such as: Mobile (112), Personal Computer (114), Teller Assisted (111) and Kiosk (113). Other configurations are also within the scope of the present invention.

Figure 3A:
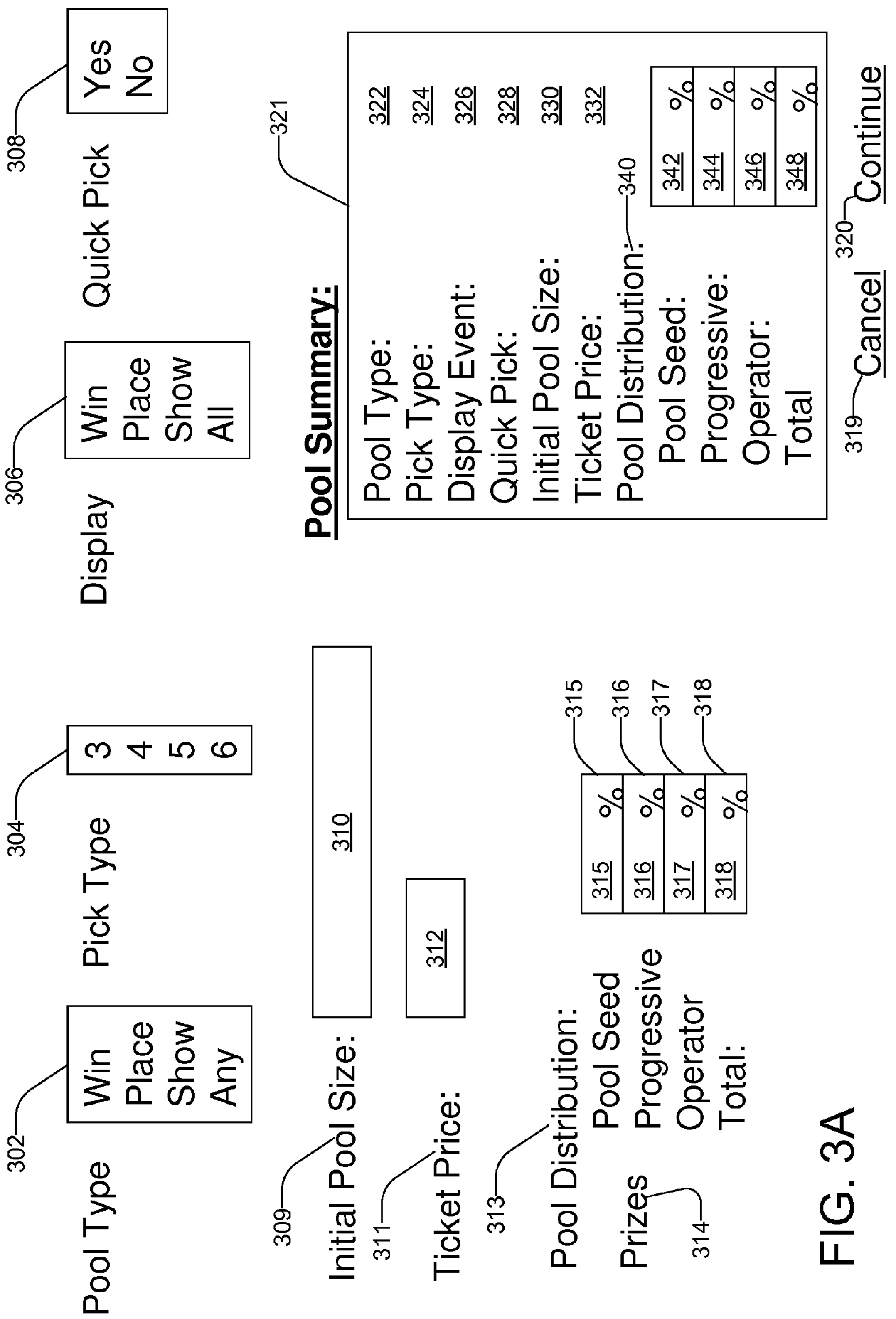
FIGS. 3A and 3B are diagrams depicting an exemplary Multi-Venue administration application for the definition of a Multi-Venue Wager, in accordance with one embodiment of the present invention.

FIG. 3A is a diagram depicting an exemplary Multi-Venue administration application (108) for the definition of a Multi-Venue Wager, in accordance with one embodiment of the present invention. In this and subsequent examples, it is assumed that the amount of winnings is not scored for the purposes determining prize award levels, but rather that multiple winners will share equally in the poor distribution. Other configurations are also within the scope of the present invention. Pool Type selection is preferably accomplished utilizing a drop down menu (302) listing the various pools available for selection. The Pick Type is also preferably selected from a drop down menu (304). A menu corresponding to the Display event field (306) determines which events will be shown. Depending on the Pool Type and the event Display selected, a Quick Pick (308) may be made accessible. The Initial Pool Size (309) determines the amount that the pool will begin with, and is entered in field (310). The price of a ticket (311) is entered in field (312). The Pool Distribution (313) determines how the amount of wagers received into the pool will be distributed. The percentage of each wager to be allocated towards Prizes (314) is distributed between the Pool Seed (315) which is the amount of each wager retained to seed the subsequent pool; and a Progressive (316), the amount of each wager that is added to the current pool. The Operator entry (317) retains the remainder of pool for the payment of fees, operations and profit. The Total field (318) should preferably add up to 100% or an error message will preferably be generated instructing the user to correct the percentage allocations. A Pool Summary (321) is generated as the pool is defined by the options on this page. The Pool Type (322), Pick Type (324), event Display (326), Quick Pick (328), Initial Pool Size (330) and Ticket Price (332) are all summarized, as is the Pool Distribution (340) including: the Pools Seed (342), Progressive (344), Operator (346) and Pool Total (349). The user may then have the option of canceling the program (319) to return to a previous page or Continuing (320) to further complete the Pool Definition.

Figure 3B:
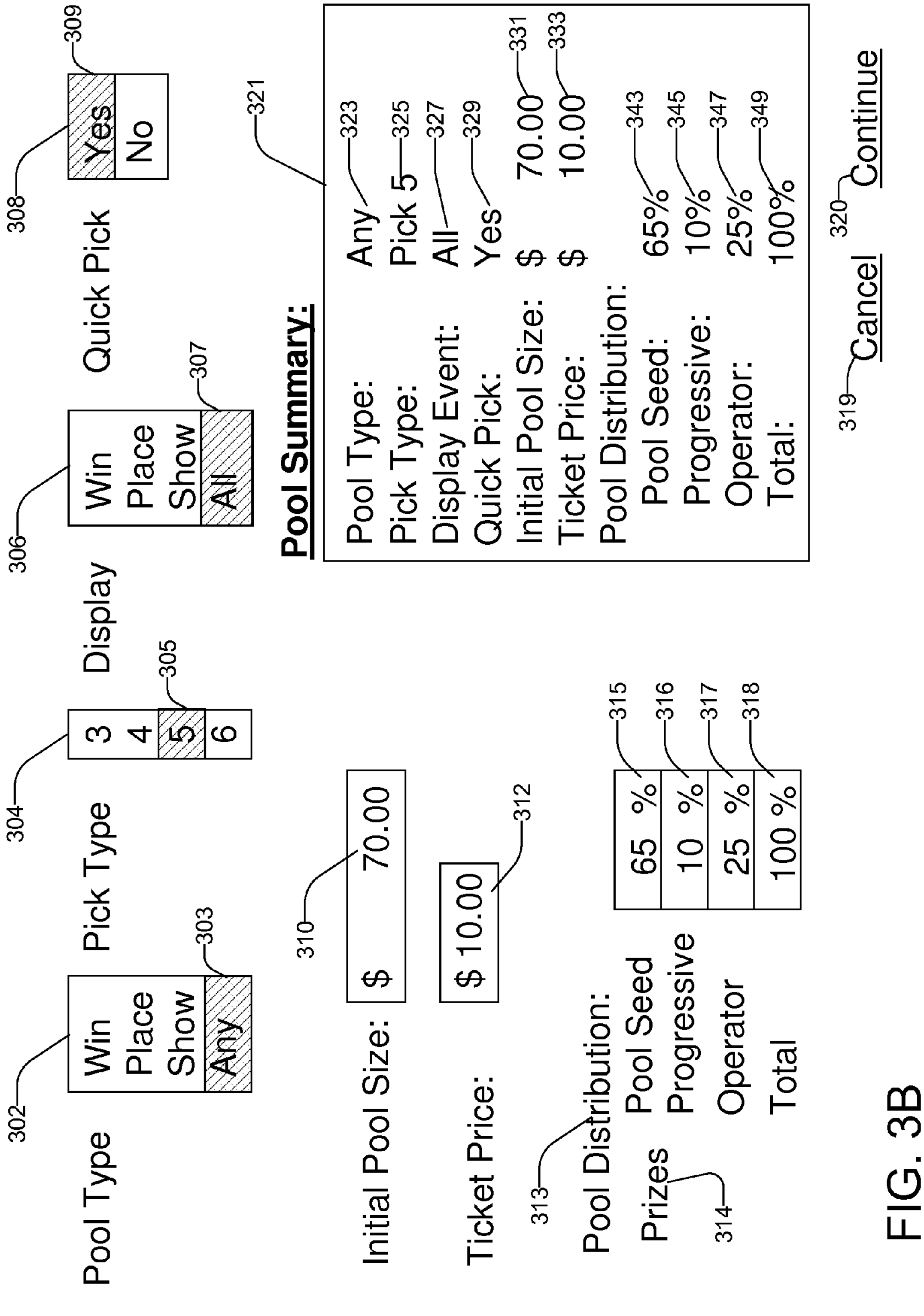
Figure 3C:
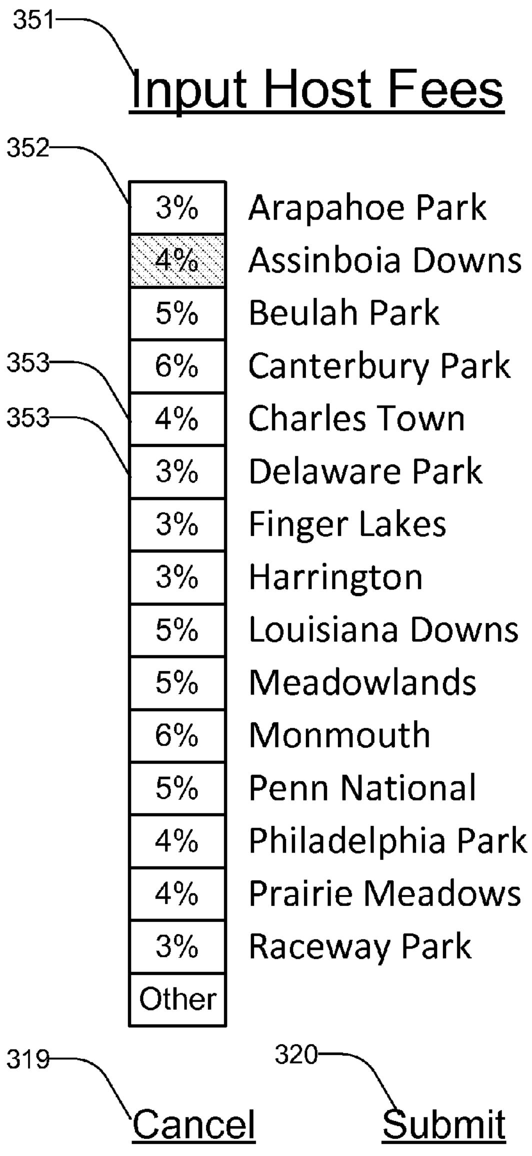
FIG. 3C is a diagram depicting the entry of racetrack fees (Host Fees) which will be used to calculate the amount of fees which will be paid to the participating venues.

FIG. 3B is a diagram depicting the Multi-Venue administration application defining a Multi-Venue Wager, in accordance with the embodiment shown in FIG. 3A. In this example, the Pool Type is selected from a drop down menu (302) where Any (303) has been highlighted as the selection. A Pick 5 Pool is selected by selecting the Pick Type from the drop down menu (304) where the number "5" (305) has been highlighted for selection. The ability for a user to select a Quick Pick is specified by highlighting the Yes (309) for the drop down menu (308). The Initial Pool Size (309) has been set to $70 by manual entry in that field (310). The Ticket Price (311) is set at $10 by manual entry in field (312). Pool Distribution (313) with the amount set for Prizes (314) is defined as 65% allocated towards the subsequent pool in Pool Seed (315). An additional 10% is allocated to the current progressive pool (316). The Operator will retain earnings of 25% and the correct total (318) is reflected as 100% in field (318). The Pool Summary (321) displays the details of the Pool in accordance to the definitions selected or input. The Pool Type (322) is an Any Pool (323); the Pool Type (324) is a Pick 5 (325). The user will be displayed (326) all sequential events (327); the Initial Pool Size (330) is $70 (331) and the Ticket Price (332) is $10 (333). The Pool Distribution (340) is summarized to be 65% (343) towards the subsequent Pool Seed (342) with 10% (345) allocated towards the current Progressive (344). The Operator's (346) retention is 25% (347) and the Total (349) s 100% (349). Once the pool has been fully defined by selecting the participating racetrack venues as shown in FIG. 3C, FIG. 3D and FIG. 3E, the Operator may either Cancel the process or submit the pool for display as an active wager. Upon submission, the system assigns a Pool Number (not shown) to the Pool. At this point the user may Cancel the process (319) or Continue (320) and further define the Pool elements FIG. 3C is a diagram depicting the entry of racetrack fees (Host Fees) which will be used to calculate the amount of fees which will be paid to the participating venues. Each track may have a different fee. The Operator will access an application facilitating the input of Host Fees (351). For each venue, the Operator accesses a drop down menu (352) containing several fee selections as well as an "Other" selection. The Operator may select any of the drop down items or use the "Other" selection to input an amount not found in the drop down menu. The Operator enters the Host Fee for each racetrack (353). At this point the user may Cancel the process (319) or Continue (320) and further define the Pool elements FIG. 3D is an example of Host Fee calculations performed by the system based on the fee schedule previously defined. Host Fees are tracked by the Pool Number (361). The Price Per Ticket (362) is used to define the Fee Base per Selection (363). Since no actual wagers are placed in the participating venues pool at the racetrack, a Fee Base is used to calculate how much would have been placed in the pool for each selection made. In this example, since the ticket price is $10.00 and there are 5 selections in the ticket the Fee Base Per Selection is $2.00. The Total Tickets Sold (364) and the Total Selections (365) based on the Total Tickets is displayed. Each venues Host Fee (366) is multiplied times the Fee Base (368) to determine the fee per selection (not shown). The Fee per Selection is multiplied times the Total Selections (367) to determine the Total Fees (369). FIG. 3E is a diagram depicting the same process using a $2 ticket as an example.

Figure 4A:
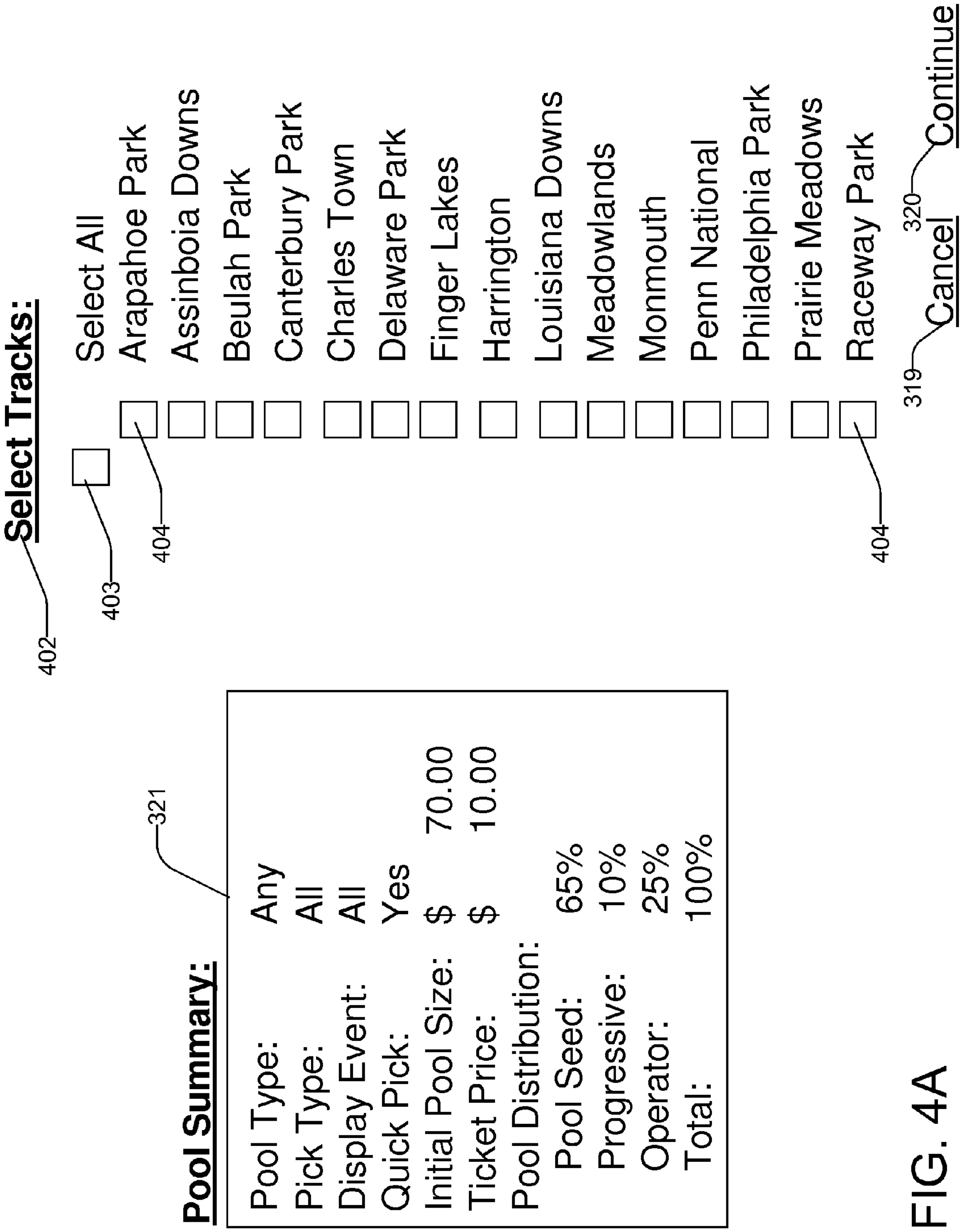
FIGS. 4A through 4D are diagrams further depicting the Multi-Venue administration application for the setup of a Multi-Venue Wager whereby a selection is offered from a plurality of venues, in accordance with the embodiment shown in FIGS. 3A and 3B.

FIG. 4A is a diagram further depicting the Multi-Venue administration application for the setup of a Multi-Venue Wager whereby a selection is offered from a plurality of venues, in accordance with the embodiment shown in FIGS. 3A and 3B. FIG. 4A depicts the track selection that will define which venues will participate in the defined Pool. A Pool Summary (321) is displayed depicting the definition of the pool thus far in the process. A Track Selection (402) is generated from the tote (101) interface. A User may elect to Select All venues (403) or select individual venues by clicking on the field associated with the venue (404). As with previous screens, the user is given the ability to Cancel the process (319) or Continue (320).

Figure 4B:
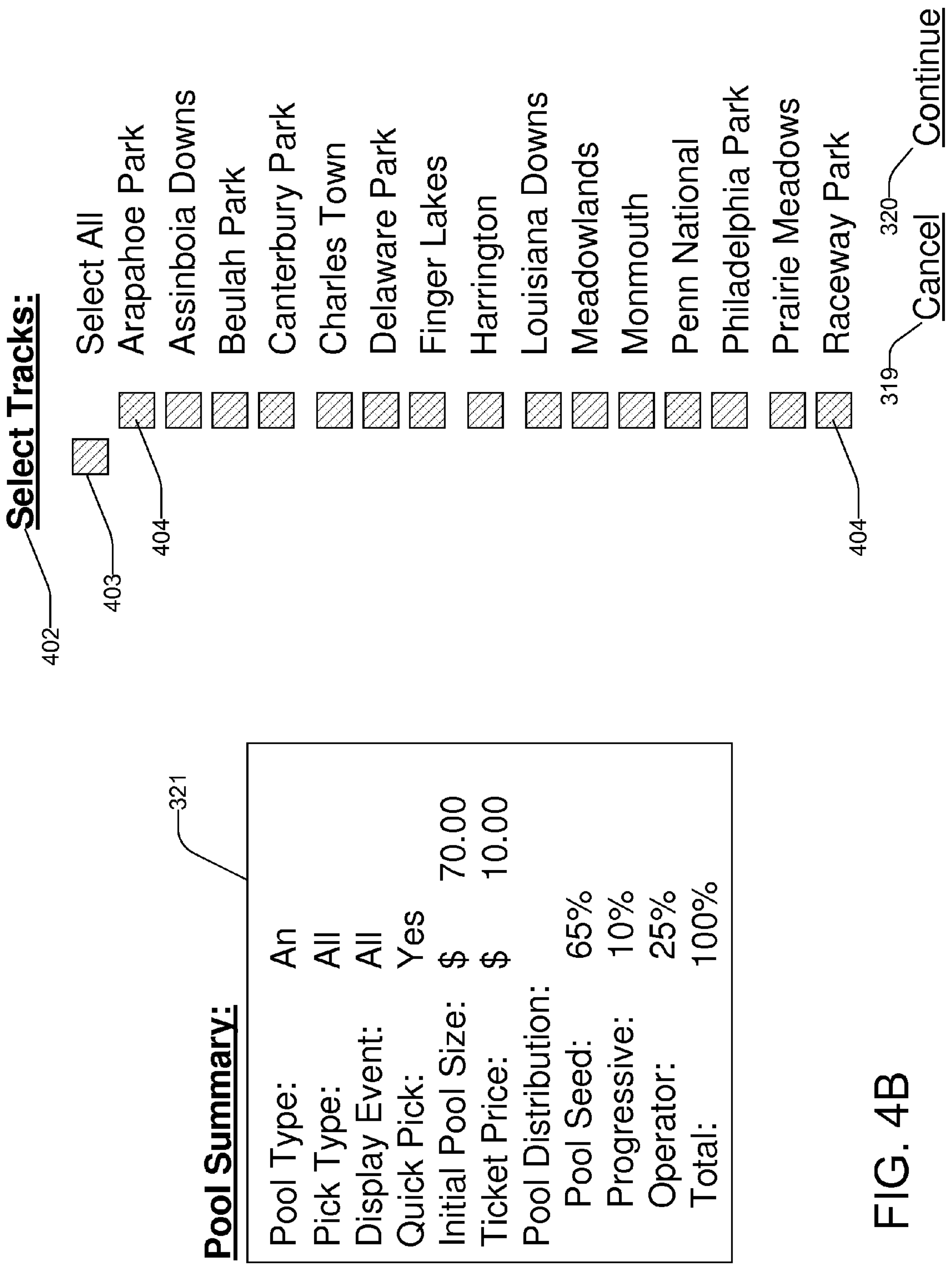

FIG. 4B is a diagram further depicting the Multi-Venue administration application for the setup of a Multi-Venue Wager whereby a selection is made from a plurality of venues utilizing a "Select All" function (403). FIG. 4B depicts the user interface for venue selections whereby the Pool Summary (321) is displayed and the available venues are displayed under the Select Tracks (402) section of the page. In this example, all of the venues have been selected by highlighting the Select All field (403). Correspondingly, all of the venues (404) have been automatically highlighted as selections. As with previous screens the user is given the ability to Cancel the process (319) or Continue (320).

Figure 4C:
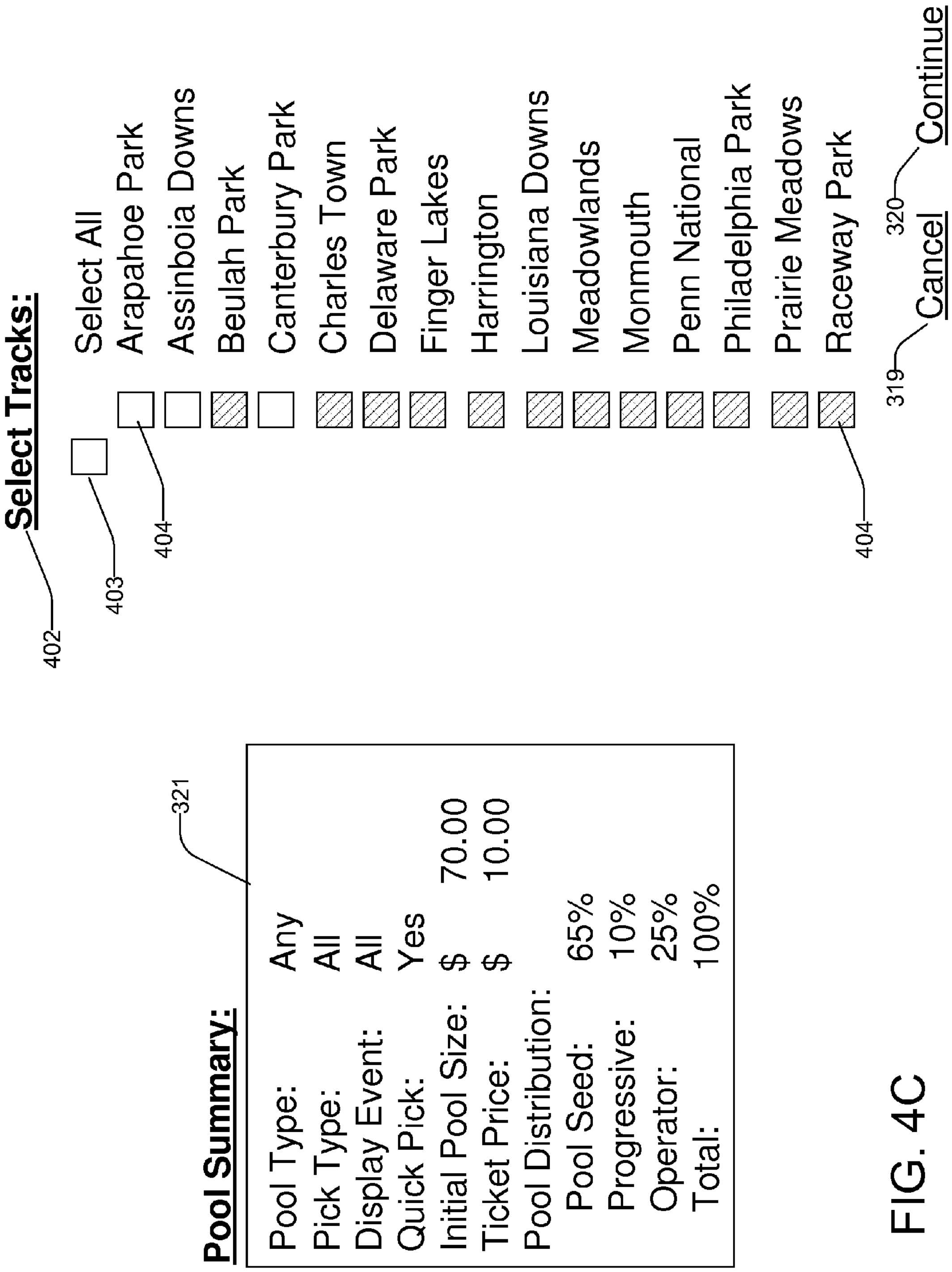

FIG. 4C is a diagram further depicting the Multi-Venue administration application for the setup of a Multi-Venue Wager whereby a selection is made from a plurality of venues on an individual basis. This FIG. depicts a user interface for venue selections whereby the Pool Summary (321) is displayed and the available venues are displayed under the Select Tracks (402) section of the page. In this example, individual venues have been selected by leaving the Select All field (403) blank. Each individual venue (404) is manually selected and highlighted as a selection available for the Multi-Venue Wager. As with previous screens the user is given the ability to Cancel the process (319) or Continue (320).

Figure 4D:
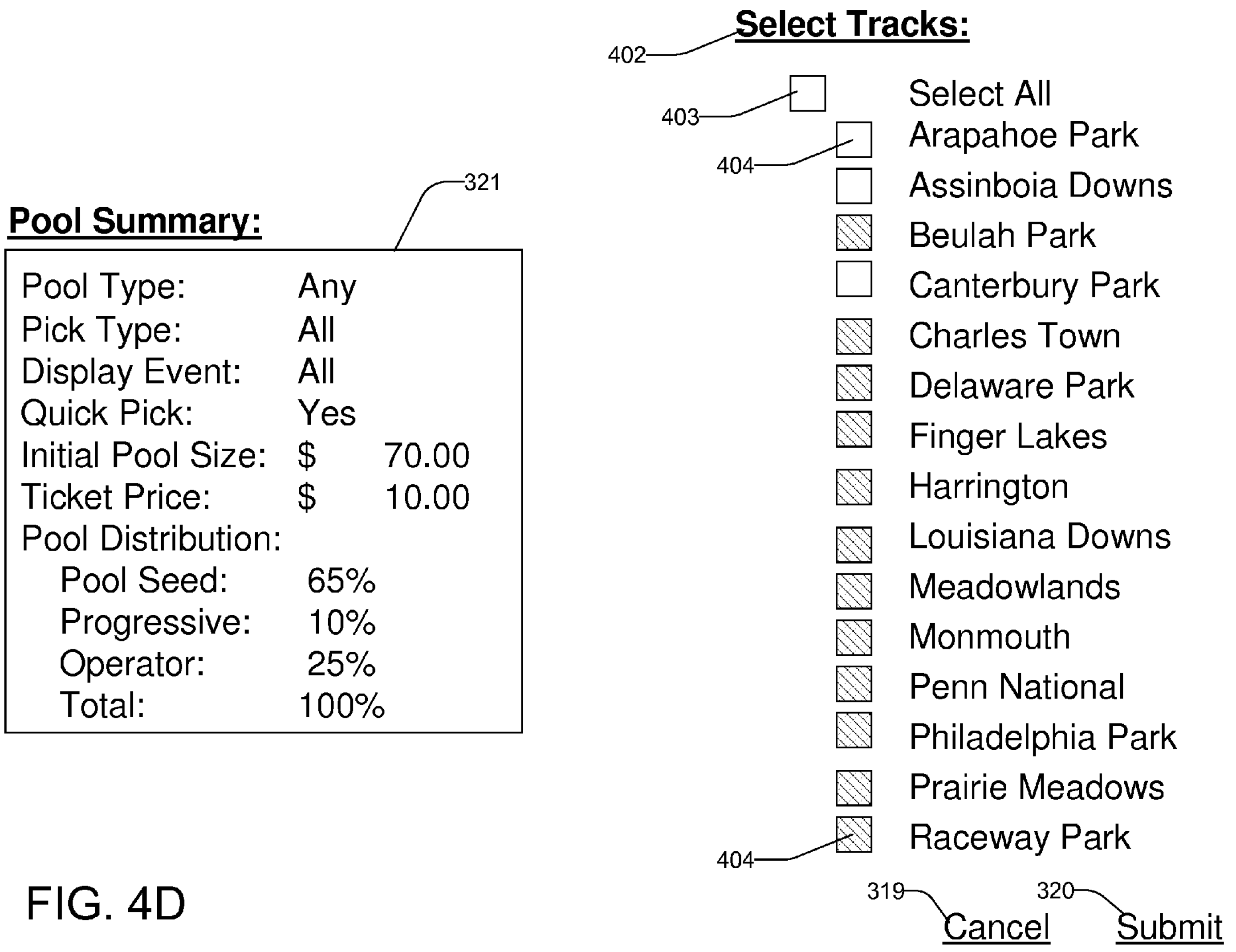

FIG. 4D is a diagram further depicting the Multi-Venue administration application for the submission of a Multi-Venue Wager for display and processing by the Multi-Venue application system. FIG. 4*d* depicts a user interface for Wager Review is offered prior to submission. The Pool Summary (321) is displayed and the available venues are displayed under the Select Tracks (402) section of the page. In this example, individual venues have been selected by leaving the Select All field (403) blank. Each individual venue (404) has been manually selected and highlighted as a selection available for the Multi-Venue Wager. As this is the final stage of the Wager definition process, the user is given the ability to Cancel the process (319) or Submit the Wager to be posted (320).

Figure 5:
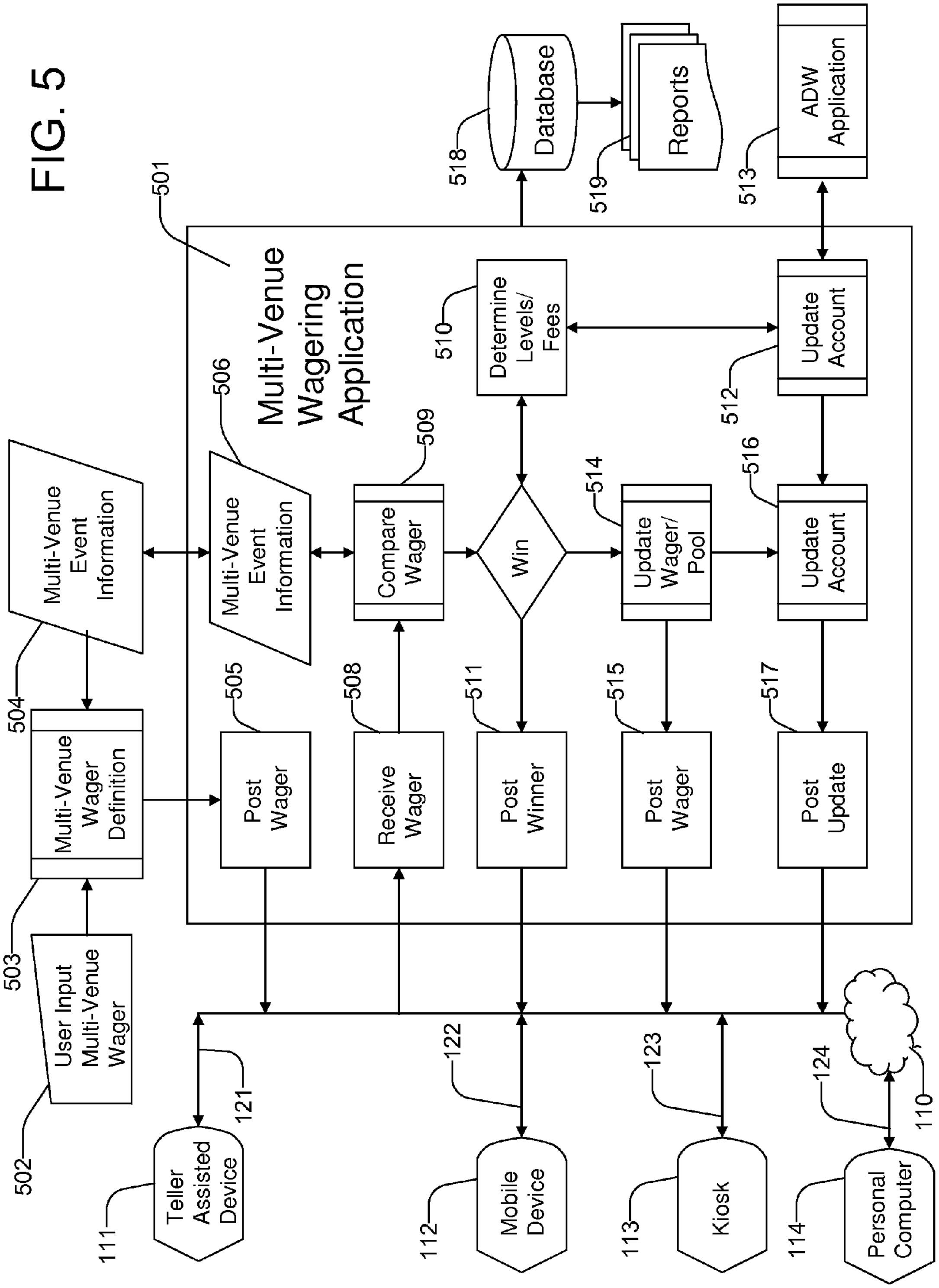
FIG. 5 is a flowchart depicting the process by which a Multi-Venue Wager is defined and processed, in accordance with one embodiment of the present invention.

FIG. 5 is a flowchart depicting the process by which a Multi-Venue Wager is defined and processed, in accordance with one embodiment of the present invention. The Multi-Venue Wagering Application (501) provides all of the processing functions of the Multi-Venue Wager from definition through payment of winnings and fees. As previously described, an administrator may use an input device (502) such as a keyboard and monitor to access the adjunct applications for Multi-Venue Wager Definition (503). Multi-Venue Event information (506) is received from the previously described tote interface and kept in constant communication with the MVWA (501). The Wager defined in the Multi-Venue Wager Definition (503) is Posted within the application (505) and transmitted through a plurality of interfaces (121, 122, 123, 124) including the Internet (110). Devices such as Teller Assisted Devices (111), Mobile Devices (112), Kiosks (113) and Personal Computers (114) may interactively display the Wager and it's components. These devices transmit the wager to the MVWA (501) where it is received by the Applications (508) where the predicted results are compared to the actual results (509) utilizing the Multi-Venue Event Information (506) supplied from the tote. If there are one or more winning entries, the system will determine the current pool amount and the distribution of the pool to the one or more winning entries. The winning entries are Posted (511) in the Application and transmitted to the previously described devices. Fees due to participating racetrack venues are calculated for payment (510). A new wager may be automatically posted through the definition of the subsequent seed amount as defined in Multi-Venue Wager Definition (503) and the process is restarted. Winners may claim the proceeds from the wager depending on the device used to place the wager. If the one or more winning entries are account based, the account is updated (512) and the ADW Application (513) is accessed in order to update the account as per the Winning entry. If there are no winning entries in a defined pool, a new pool is posted based on the next subsequent event as received from the Multi-Venue Event Information (506) and seeded with the then current amount of the previous Pool. The updated wager and Pool (514) is defined and Posted (515) to be made available to the interactive devices. As previously described for winning entries, losing entries utilizing account based transactions have their accounts updated (516) through communications with the ADW Application (513) and are then posted (517) for distribution to account based interactive devices. All information relating to the definition and processing of wagers, including the receipt, comparison and payment of winnings and fees are recorded in a database (518) for future reporting requirements (519).

FIG. 6A is diagram shown an example of a Pick 5, Play Any Event, Multi-Venue Wager display, in accordance with one embodiment of the present invention. It should be noted that Pool Information and Ticket Price is not shown in this, or the following examples. In this embodiment, the Display (601) is comprised of 25 separate events/wagers arranged in a 5×5 grid of squares. Each square in the display depicts a specific wagering opportunity based upon the favorite runner (e.g. horse) to win their event. As previously described, this has been defined (302) as Play Any Event Wager (303), and the display (306) has been set to All (307), therefore each wager related to the event is displayed. For each favorite runner in a race, the corresponding Win (611), Place (612), and Show (613) selections are shown. In example selection (615) for Monticello Race 9 displays: the race number (619); the minutes to post (616) or start; the runner (e.g. horse) name (617); and the selection type (618): $2 to Place. In this example, races are ordered by time and Win/Place/Show, in rows, starting at the top left corner, which in this example shows here Finger Lakes Race 6 Runner #1 to Win (621), Place (622), or Show (623) starting in 17 minutes, down to the lower right corner, which displays here Yavapi Downs Race 1 Runner #7 to Win starting in 61 minutes (631). The configuration shown in FIGS. 6A-6F is exemplary. Displays with other numbers of boxes for races or picks than 25 are within the scope of the present invention, as are other arrangements of boxes within the display.

The player can then make his selection by clicking on each box. Players may then handicap their picks and make individual selections based upon their expertise. In a Pick 5 game, the player could pick five picks or wagers. Alternatively, since each runner is a favorite, novice players may simply select a Quick Pick (604) that will randomly select 5 selections for them. An "All Down" variation of the Quick Pick automatically highlights the 5 vertical selections directly below the All Down button (606). Correspondingly, an "All Across" option (608) may be available that will automatically highlight the 5 horizontal picks associated with it. At any time during the process the user may select to clear the selections (602) and start over. Once satisfied with the selections made, the player can place the wager by clicking on the Submit Selection button (603). Note for future reference that Delaware Park, Race 6 (631-633) is the next sequential race after Finger Lakes, Race 6 (621-623) and that the Yavapai Downs, Race 1, Win selection (641) is the last event on this Multi-Venue Wager.

FIG. 6B is a diagram showing additional information available to the player from the racing venue information shown in FIG. 6A. To view additional information the player simply places the cursor over the runner number in one of the cells. This is commonly referred to as hovering over a field. Other methods are also within the scope of the present invention. For the Monticello (615), Race 9 (619), $2 Place selection (618), the hover action causes the display of additional Runner Details (650). Other methods of displaying these details are also within the scope of this invention. These details may include the Runner's Name (654), Runner Number (655), Odds (656), Colors (657), Jockey Name (658), weight (659), and owner (653). The Odds (656) may be predetermined to be morning line, odds when a pool opened, current odds, or odds at some other predefined time. The colors associated with a runner, commonly referred to as silks may be displayed (657), as may be the Jockey's Name (658) and the Jockey's Weight (659). The Owner's Name (653) may also be furnished, along with his home. Other information may be available for display and is left to the discretion of the operator to decide what information is displayed.

Figure 6C:
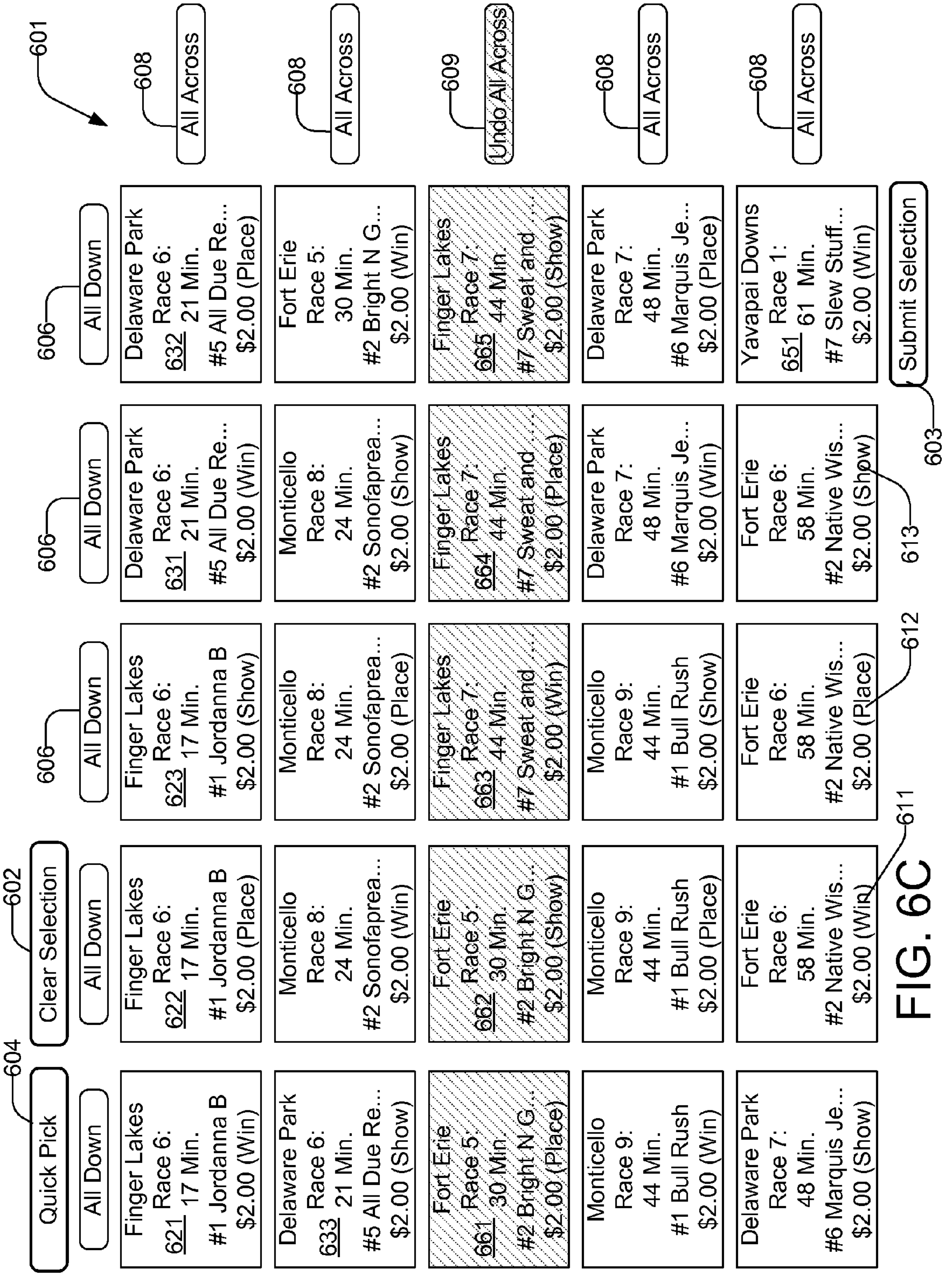

FIG. 6C is a diagram showing an exemplary depiction of an "All Across" selection where the "All Across" (608) button associated with the 3$^{rd}$ horizontal row has been selected. In this example, the player has relied upon the system to highlight: Fort Erie, Race 6, $2 Place (661) and Show (662), in addition to Finger Lakes, Race 7, Win (663), Place (664) and Show (665). Upon selection, the "All Across" button (608) may change to "Undo All Across" (609) providing the player with a simple method for clearing the selection and starting over. Alternatively the user may simply press the "Clear Selection" button (602). In one embodiment of the present invention, the selected wagers (661-665) and the "Undo All Across" button (609) are highlighted by, for example, changing color, indicated in this FIG. by being shaded. When the player is satisfied with their selection, the "Submit Selection" button (603) may be pressed and the wager may be submitted for confirmation and processing.

Figure 6D:
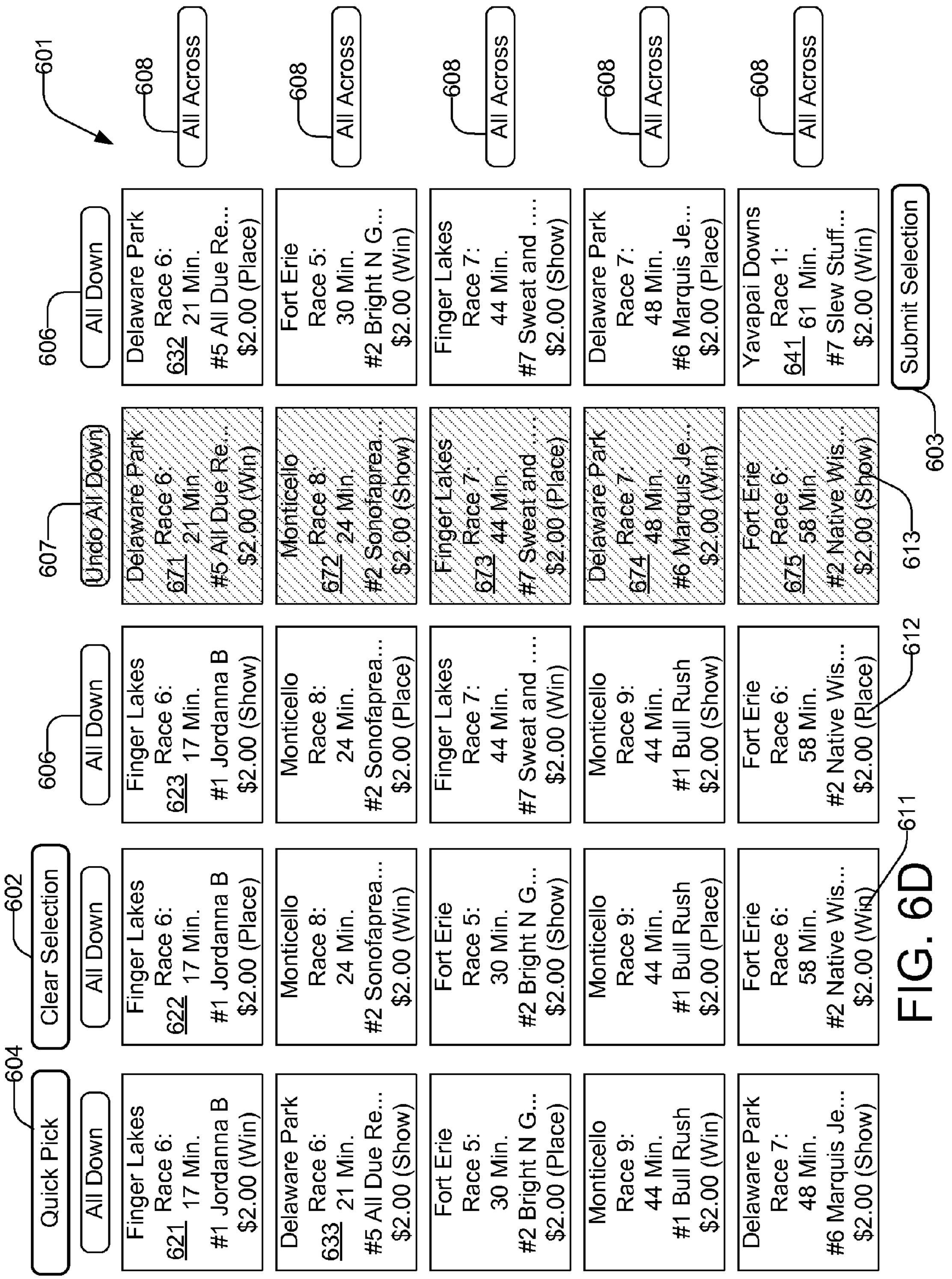

FIG. 6D is a diagram showing an exemplary depiction of an "All Down" selection where the "All Down" (606) button associated with the 4$^{th}$ vertical column has been selected. In this example, the player has relied upon the system to highlight: Delaware Park, Race 6, $2 Win (671); Monticello, Race 8, $2 Show (672); Finger Lakes, Race 7, $2 Place (673); Delaware Park, Race 7, $2 Place (674); and Fort Erie, Race 6, $2 Show (675). Upon selection, the "All down" button (606) may change to "Undo All Across" (609), providing the user with a simple method for clearing the selection and starting over. Alternatively the player may simply press the "Clear Selection" button (602). In one embodiment of the present invention, the selected wagers (671-675) and the "Undo All Down" button (607) are highlighted by, for example, changing color, indicated in this FIG. by being shaded. When the player is satisfied with their selection, the "Submit Selection" button (603) may be pressed and the wager is submitted for confirmation and processing.

Figure 6E:
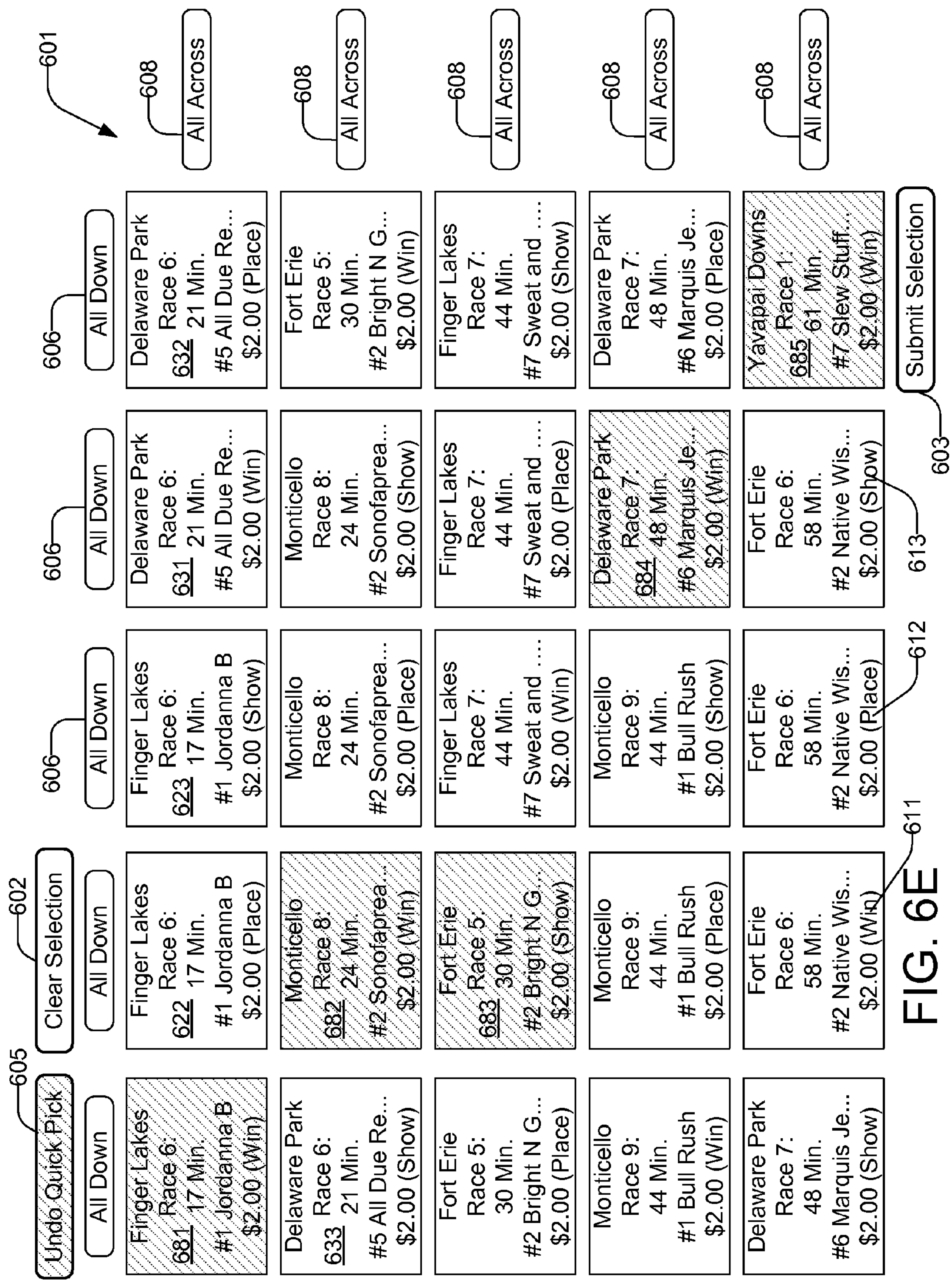

FIG. 6E is a diagram showing an exemplary depiction of a "Quick Pick" selection where the "Quick Pick" (604) button has been selected. In this example, the player has relied upon the system to highlight: Finger Lakes, Race 6, $2 Win (681); Monticello, Race 8, $2 Win (682); Fort Erie, Race 6, $2 Show (683); Delaware Park, Race 7, $2 Win (684); and Yavapai Downs, Race 1, $2 Win (685). Upon selection, the "Quick Pick" button (604) may change to "Undo Quick Pick" (605) providing the user with a simple method for clearing the selection and starting over. Alternatively the player may simply press the "Clear Selection" button (602). In one embodiment of the present invention, the selected wagers (681-685) and the "Undo Quick Pick" button (605) are highlighted by, for example, changing color, indicated in this FIG. by being shaded. When the player is satisfied with their selection, the "Submit Selection" button (603) may be pressed and the wager is submitted for confirmation and processing.

Figure 7:
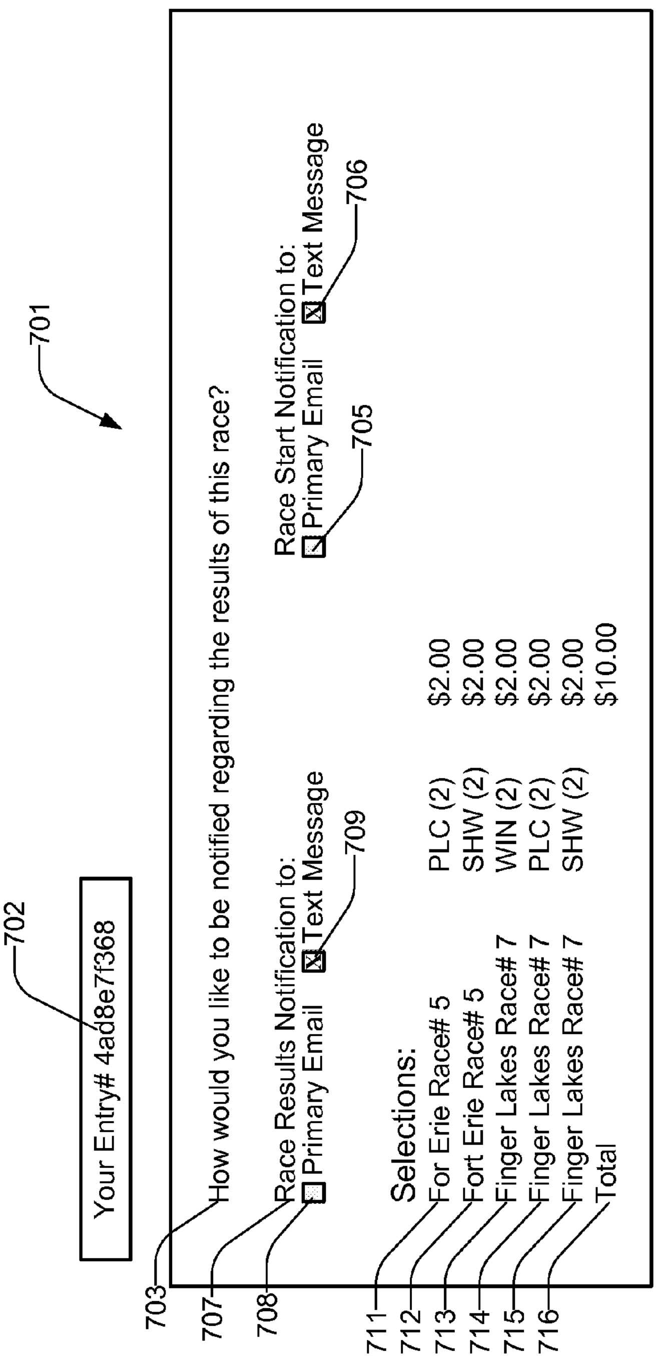
FIG. 7 is a diagram showing an exemplary wager confirmation, in accordance to the wager placed in FIG. 6C.

FIG. 7 is a diagram showing an exemplary wager confirmation, in accordance to the wager placed in FIG. 6C. The wager confirmation (701) is provided after the system has verified that all entry selections are valid in the tote system and an entry number is given (702). In this example the player may elect to be notified (703) for each entry of the Race Start (704) by either email (705) and/or Text Message (706). Correspondingly, the player may request the results of each selection (707) be sent to him by either email (708) and/or Text Message (709). Each selection in his wager is displayed: Fort Erie, Race 6, $2 Place (711) and Show (712) in addition to Finger Lakes, Race 7, Win (713), Place (714) and Show (715) for a total of $10.00 (716).

Figure 6F:
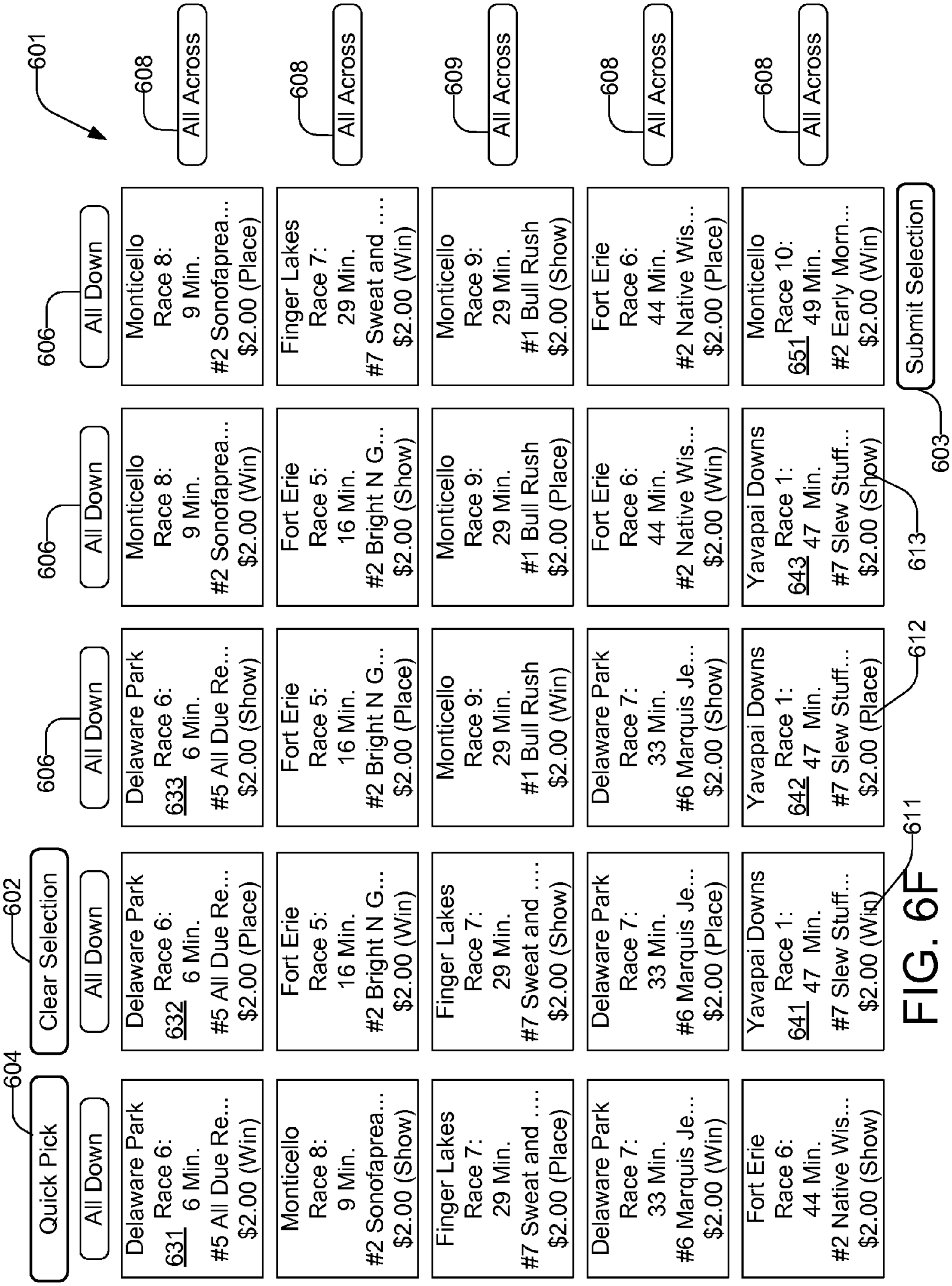

FIG. 6F is a diagram showing an exemplary subsequent Pick 5 Wager, in accordance with the example shown in FIG. 6A, assuming that there were no winning entries in the previous pool. The seed amount of the new pool would be the amount unclaimed from the previous pool (not shown). Note that in the new pool, Delaware Park, Race 6 (631-633), previously the second set of selections of the preceding pool, is now the first set of selections of the new pool. As the next sequential event, the new pool began 4 minutes following the conclusion of the first race of the preceding pool. Yavapai Downs, Race 1, $2 Win (641) remains the last event of the preceding pool while Yavapai Downs Race 1 $2 Place (642) and Show (643) have been added to the new pool and Monticello, Race 10, $2 Win (651) is now the last event of the new pool.

Figure 8A:
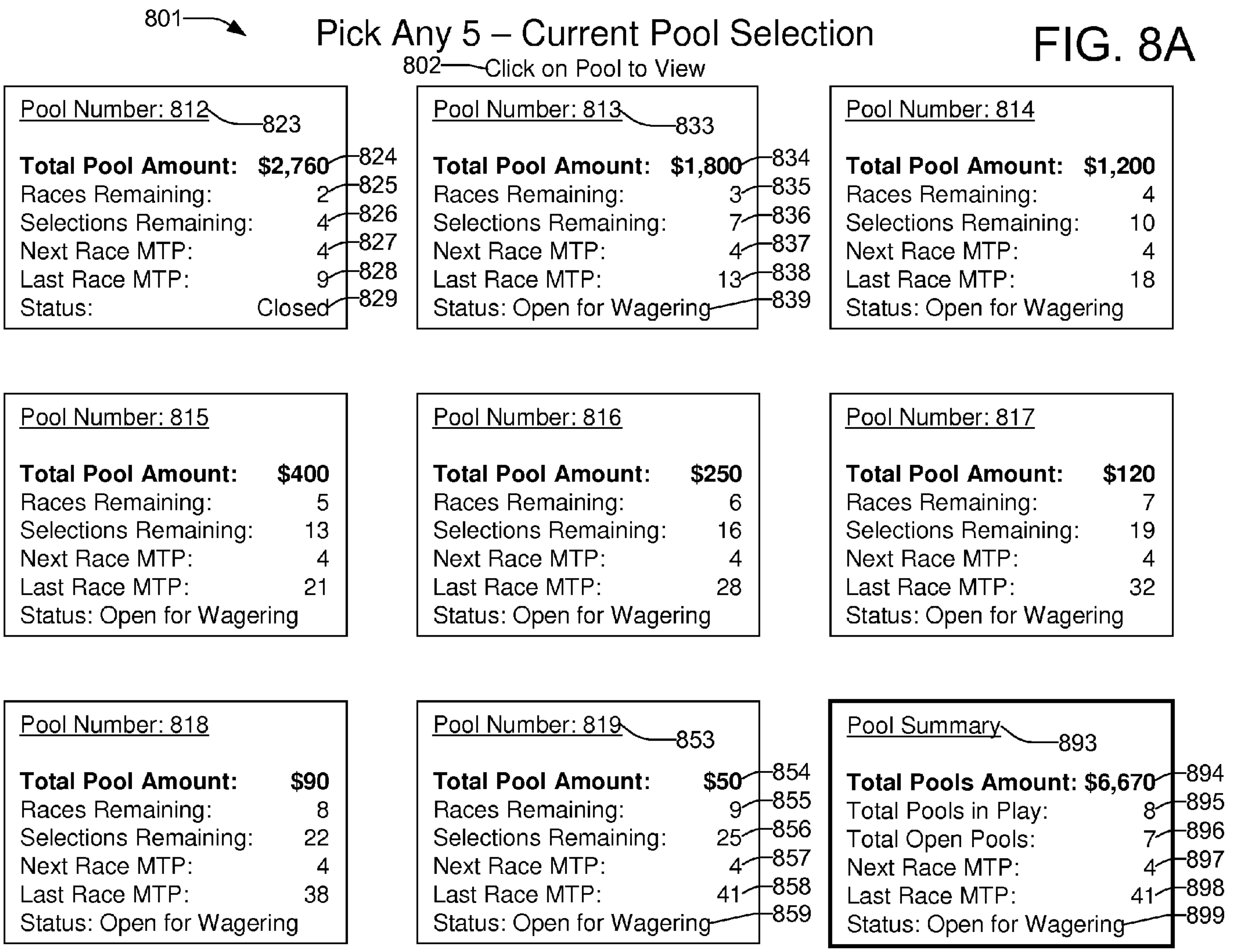
FIGS. 8A and 8B are diagrams showing an example of a concurrent pool display depicting the sequential and progressive nature of the pools, in accordance with one embodiment of the present invention.

FIG. 8A is a diagram showing an example of a concurrent pool display depicting the sequential and progressive nature of the pools, in accordance with one embodiment of the present invention. It shows an example of a Pick Any 5 Pool Selection display (801). In this display, the user is instructed to click on any pool (802) to display the pool selections. There are eight pools shown (812-819). For each pool a summary is given in the Pool Selection. For example, in Pool 812 (823) the total amount of the pool is $2,760 (824); there are 2 races remaining (825) with four selections (826). The reason that there are 2 Races Remaining but 4 Selections, is that since the pool is a grid of 25 boxes and there are 3 wager possibilities in for each event, the first 8 events (24 wager possibilities) are shown plus the next wagering possibility of the next race. Therefore, there are 8 races with Win, Place, and Show and 1 race with a Win only bet for a total of 25 wagering possibilities. The minutes to post (MTP) or start time for the next race shows how much time is left until the next race starts. In this case the Next Race MTP is 4 minutes (827). The last race in this pool will start in 9 minutes (828). Since there are not enough selections left in this pool to place a wager, the Status (829) of the pool is "Closed". Pool number 813 (833) shows that there is a Total Pool Amount of $1,800 (834) and three Races Remaining (835) and a total of 7 Selections Remaining (836). Since this pool (813) shares the same common first event as Pool Number 812, the Next Race MTP (837) is also 4 minutes. In this example, another race has been added, and the Last Race MTP (838) is now 13. Since there are 7 selections remaining, the Pool Status (839) is "Open for Wagering". Pool Number 819 (853) is the final concurrent Pool in sequence. This pool reflects a Total Pool Amount (854) of $50, the initial pool seed amount in this example. There are a total of 9 Races Remaining (855), consisting of 8 races with Win, Place and Show (24 wagering selections) and 1 race with a Win selection for a total of 25 Selections (856). As with Pool Number 813, the Next Race MTP (857) is the same as Pool 812, with 4 minutes remaining until the next race. The Last Race in this Pool (858) has 42 minutes to post (start) time, and the Status (859) is "Open for Wagering". The Pool Summary (893) shows the data for total concurrent pools in play. Assuming that there were no winners and no further wagers, the Total Pools Amount (894) is $6,670. This is the aggregate of all of 8 Total Pools in Play (895), of which there are 7 Total Open Pools (896). The Next Race MTP (897) and the Last Race MTP (898) are consistent with the last pool in play, Pool Number 819, and since there is at least 1 pool open for wagering, the Status (899) is "Open".

Figure 8B:
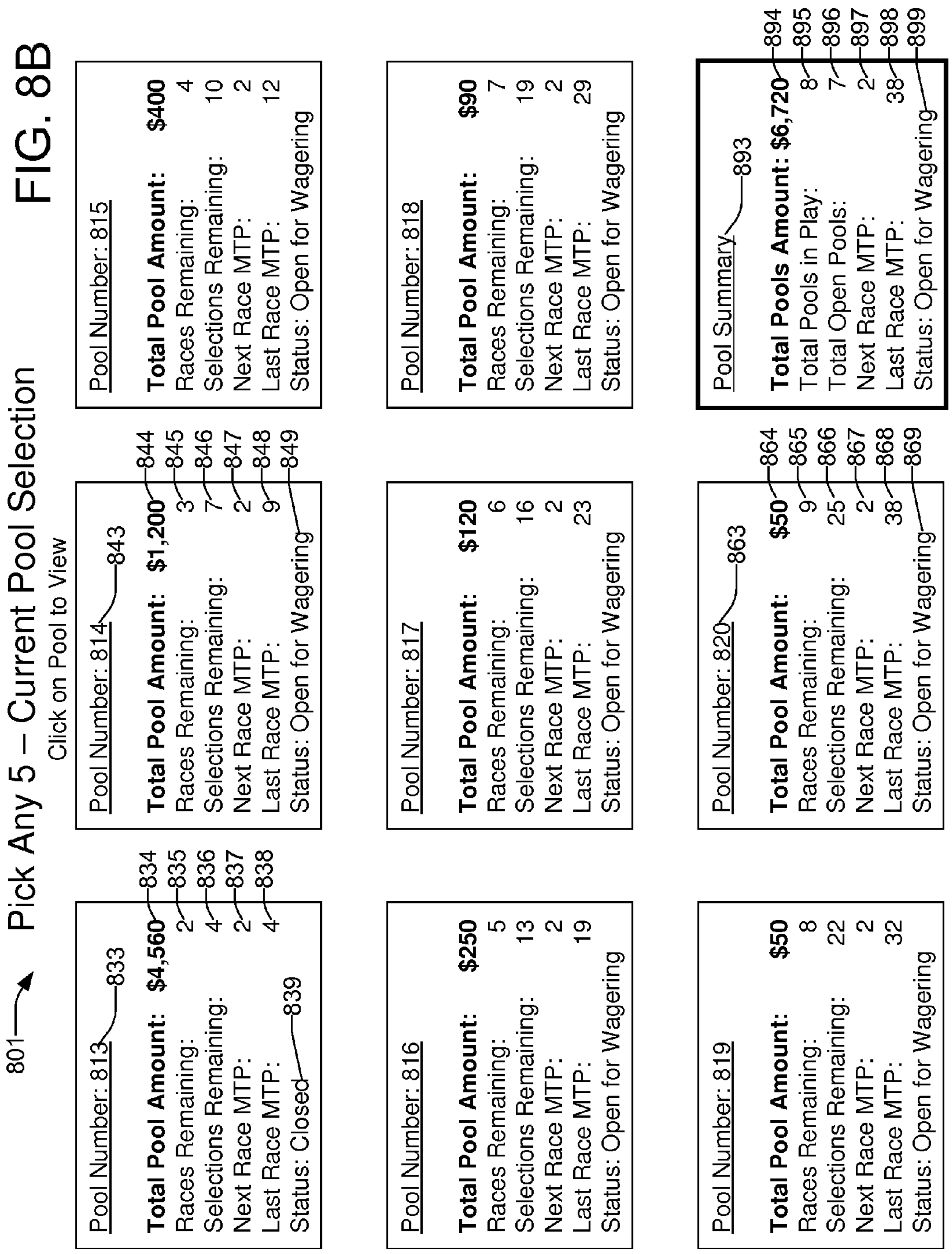

FIG. 8B is a diagram that further exemplifies the sequential nature of the pools depicting the addition of a new pool (820) upon the completion of the last race of the previous pool (812) as shown in FIG. 8A. For simplicity, this example assumes that there were no winners and that no additional wagers have been place. Once the final race in Pool 812 (FIG. 8A) has been run, Pool Number 813 (833) becomes the next successive pool. The Total Pool Amount (834) reflects the amount in Pool 812 ($2,760) carried over and added to Pool Number 813 ($1,800) for a total of $4,560. As is consistent with FIG. 8A, there are 2 Races Remaining (835) and 4 Selections Remaining (836). The Next Race MTP (837) is 2 minutes and the Last Race MTP (838) is 4 minutes. Since there are only 4 Selections Remaining, and not enough selections to place a wager, the pool is closed (839). Pool Number 814 (843) now becomes the second pool in sequence, with a Total Pool Amount (844) of $1,200, 3 Races Remaining (845), and 7 Selections Remaining (846). The Next Race MTP (847) is consistent with Pool Number 813 at 2 minutes and the Last Race MTP (848) has advanced from 18 to 9 minutes; the difference being the 9 Minutes to Post for the Last Race MTP as shown in FIG. 8A for Pool Number 812. The Status (849) of this pool remains "Open for Wagering". Pool Number 820 (863) is the new pool which was created when the last race of Pool 812 was finished. The Total Pool Amount (864) reflects the initial pool seed amount consistent in FIG. 8A of $50. As in Pool 819 in FIG. 8A, this pool has 9 Races Remaining (865) and 25 Selections Remaining (866). Consistent with Pool Number 813, the first pool in sequence, the Next Race MTP (867) is 2 minutes. However, since this pool adds a new event to the sequence of events, the new Last Race MTP (868) reflects that event and is displayed at 38 minutes and the Status (869) is "Open for Wagering". The Pool Summary (893) reflects the current Total Pools Amount (894), now $6,270, after the addition of the new pool (820). As previously described, the Total Pools is Play (895) remains 8, the Total Open Pools (896) is still 7. The Next Race MTP (897) is consistent with Pool 813 and all of the pools in this sequence and there are 38 minutes for the Last Race MTP (898). Since there is at least 1 pool open for wagering, the Status (899) is "Open for Wagering".

FIGS. 9A, 9B, and 9C show exemplary calculations of payout odds for Pick 4 (FIG. 9A), Pick 5 (FIG. 9B), and Pick 6 (FIG. 9C), in accordance with one embodiment of the present invention. They all assume a probability of 30.8% for picking winners, 51.2% for places, and 65.5% for shows.

Figure 10:
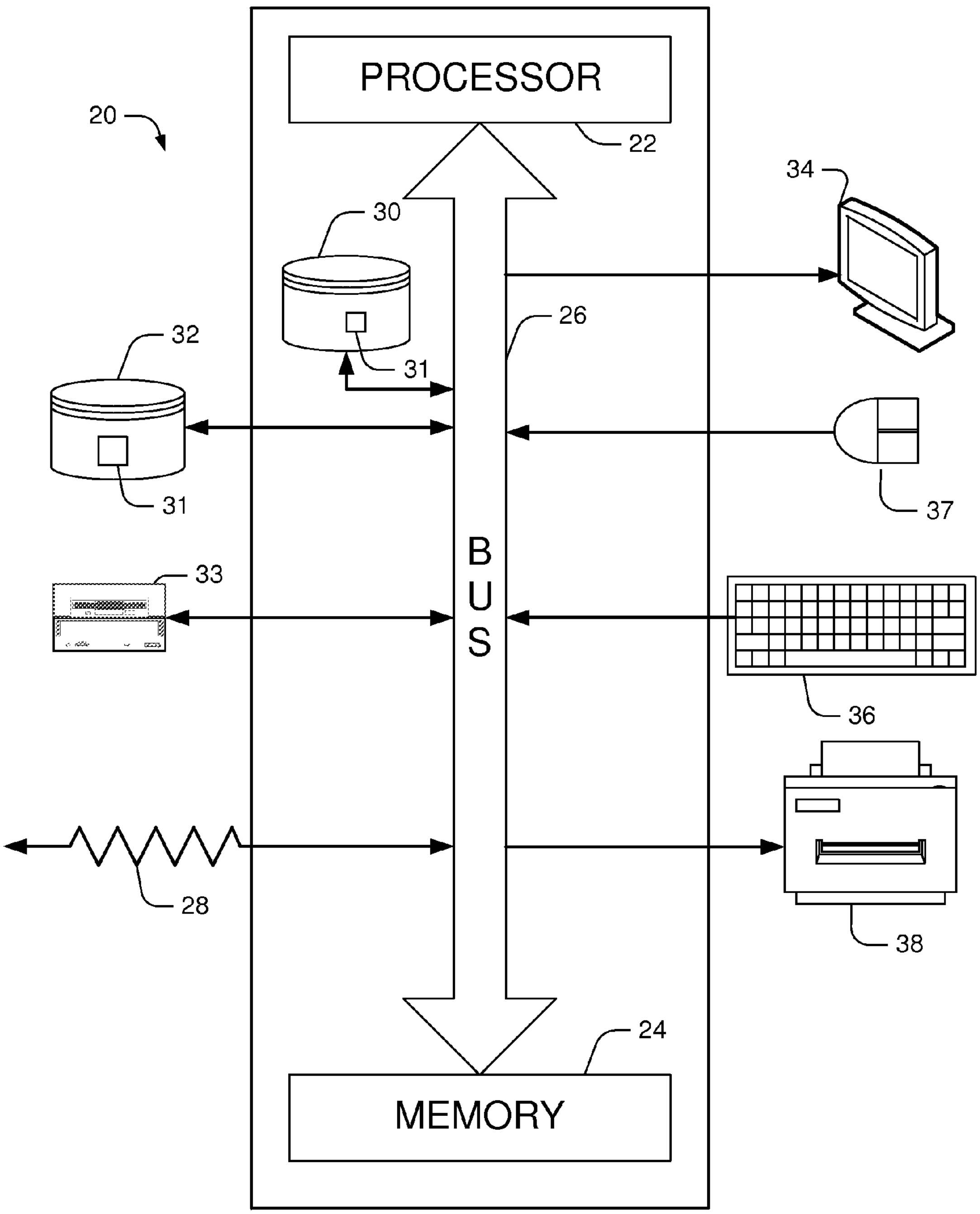
FIG. 10 is a block diagram illustrating a General Purpose Computer 20, such as utilized for receiving wagers and determining winnings, in accordance with the present invention.

FIG. 10 is a block diagram illustrating a General Purpose Computer 20, such as utilized as servers and clients, in accordance with the present invention. The General Purpose Computer 20 has a Computer Processor 22 (CPU), and Memory 24, connected by a Bus 26. Memory 24 is a relatively high speed machine readable medium and includes Volatile Memories such as DRAM, and SRAM, and Non-Volatile Memories such as ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such operating systems, utilities, user programs, and software to accept wagers and determine winnings can be stored in a Computer Software Storage Medium, such as memory 24, Secondary Storage 30, and External Storage 32. Executable versions of computer software 33, such as defragmentation software and operating systems can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Those skilled in the art will recognize that modifications and variations can be made without departing from the spirit of the invention. Therefore, it is intended that this invention encompass all such variations and modifications as fall within the scope of the appended claims.

What is claimed is:

1. A method of conducting concurrent multi-venue multi-race multi-outcome progressive pari-mutuel wagering comprising:

receiving by an application on a computing device a selection of a plurality of events from a player, the selection of the plurality of events being selected from a pre specified set of selectable events for a multi-venue, multi-race wager, each of the pre specified set of selectable events automatically selected by the application from future events and being a predicted result of a race for a runner, each pre specified set of selectable events containing results of runners from races at a plurality of venues, the selected events associated with one or more of the plurality of the venues;

receiving a wager by the application on the computing device from the player on the selected plurality of events for that player;

determining by the application whether the player was a winner of the wager based on results from at least one of the selected plurality of events; and providing a reward to the player if the player was determined to be a winner.

2. The method in claim 1 which further comprises:

presenting the player with a selection matrix of selectable events as the pre specified set of selectable events that allows the player to select the plurality of events from the selection matrix, said selection matrix of selectable events being displayed for selection as a plurality of rows and plurality of columns of selectable events, the pre-specified set of selectable events selected from a morning entry which includes a list of entries for a race meet and the probable odds on each entry that is posted before the betting begins, or by the current odds at the time the race meet becomes available for inclusion in the wager.

3. The method in claim 2 wherein:
the selection matrix provides for a selection of an entire row of selectable events as the selected plurality of events; and
the selection matrix provides for a selection of an entire column of selectable events as the selected plurality of events.
4. The method in claim 2 wherein:
the selection matrix provides for a random selection of the plurality of events as the selected plurality of events.
5. The method in claim 1 which further comprises:
establishing a pool containing wagers from at least one player for the pre-specified set of selectable events;
adding the wager of the player to the pool; and
splitting the pool among winners of the pre specified set of selectable events.
6. The method in claim 5 wherein:
a plurality of pools are established for a corresponding plurality of pre specified sets of selectable events;
at least a portion of pools that do not have winners are rolled into later pools.
7. The method in claim 6 wherein:
the corresponding plurality of pre specified sets of selectable events contain a rolling set of selectable events, with different sets containing selectable events for at least some different races.
8. The method in claim 6 which further comprises:
seeding pools that do not have a minimum size from rollovers from other pools.
9. The method in claim 1 wherein:
each event in the pre specified set of selectable events is selected from a set consisting of winning, showing, and placing in a pre specified race for a pre specified runner.
10. The method in claim 1 wherein:
the runners in the pre specified set of selectable events are the favorites for their respective races.
11. A system for conducting concurrent multi-venue multi-race multi-outcome progressive pari-mutuel wagering comprising:
a computer system containing a processor and a computer readable medium containing software instructions executable by the processor for:
receiving by an application on a computing device a selection of a plurality of events from a player, the selection of the plurality of events being selected from a pre specified set of selectable events for a multi-venue, multi-race wager, each of the pre specified set of selectable events automatically selected by the application from future events and being a predicted result of a race for a runner, each pre specified set of selectable events containing results of runners from races at a plurality of venues, the selected events associated with one or more of the plurality of the venues;
receiving a wager by the application on the computing device from the player on the selected plurality of events for that player;
determining by the application whether the player was a winner of the wager based on results from at least one of the selected plurality of events; and
providing a reward to the player if the player was determined to be a winner.
12. The system in claim 11 wherein the software instructions further provide for:
presenting the player with a selection matrix of selectable events as the pre specified set of selectable events that allows the player to select the plurality of events from the selection matrix, said selection matrix of events being displayed for selection as a plurality of rows and plurality of columns of selectable events.
13. The system in claim 12 wherein:
the selection matrix provides for a selection of an entire row of selectable events as the selected plurality of events; and
the selection matrix provides for a selection of an entire column of selectable events as the selected plurality of events.
14. The system in claim 12 wherein:
the selection matrix provides for a random selection of the plurality of events as the selected plurality of events.
15. The system in claim 11 wherein the software instructions further provide for:
establishing a pool containing wagers from at least one player for the pre-specified set of selectable events;
adding the wager of the player to the pool; and
splitting the pool among winners of the pre specified set of selectable events.
16. The system in claim 15 wherein:
a plurality of pools are established for a corresponding plurality of pre specified sets of selectable events;
at least a portion of pools that do not have winners are rolled into later pools.
17. The system in claim 16 wherein:
the corresponding plurality of pre specified sets of selectable events contain a rolling set of selectable events, with different sets containing selectable events for at least some different races.
18. The system in claim 16 wherein the software instructions further provide for:
seeding pools that do not have a minimum size from rollovers from other pools.
19. The system in claim 11 wherein:
each event in the pre specified set of selectable events is selected from a set consisting of winning, showing, and placing in a pre specified race for a pre specified runner.
20. The system in claim 11 wherein:
the runners in the pre specified set of selectable events are the favorites for their respective races.
21. A system for conducting concurrent multi-venue multi-race multi-outcome progressive pari-mutuel wagering comprising:
a totalisator that accepts race results from a plurality of race venues;
a tote interface database for storing results from the totalisator; and
a multi-venue application server coupled to the tote interface database, said multi-venue application server providing multi-venue administration and a multi-venue interface, the multi-venue application server including one or more applications executable by a processor to:
receive a selection of a plurality of events from a player, the selection of the plurality of events being selected from a pre specified set of selectable events for a multi-venue, multi-race wager, each of the pre specified set of selectable events automatically selected from future events and being a predicted result of a race for a runner, each pre specified set of selectable events containing results of runners from races at a plurality of venues, the selected events associated with one or more of the plurality of the venues,
receive a wager from the player on the selected plurality of events for that player, determine whether the player was a winner of the wager based on results from at least one of the selected plurality of events, and determine a reward to the player if the player was determined to be a winner.

22. The system in claim 21 wherein the multi-venue user interface comprises:

a system for displaying multi-venue wagers;

a system for transmitting and receiving wager information; and a system for updating the displaying of multi-venue wagers.

23. The system in claim 21 wherein the multi-venue user interface comprises a communications subsystem for communicating with a set comprising mobile devices, and personal computers.

24. The system in claim 21 which further comprises:

a system for defining wagers; and an input device coupled to the system for defining wagers.

* * * * *